United States Patent [19]

Pontiff

[11] Patent Number: 5,026,736
[45] Date of Patent: Jun. 25, 1991

[54] MOLDABLE SHRUNKEN THERMOPLASTIC POLYMER FOAM BEADS

[75] Inventor: Thomas M. Pontiff, Gansevoort, N.Y.

[73] Assignee: Astro-Valcour, Inc., Glens Falls, N.Y.

[21] Appl. No.: 295,618

[22] Filed: Jan. 10, 1989

Related U.S. Application Data

[60] Continuation-in-part of Ser. No. 73,642, Jul. 15, 1987, Pat. No. 4,870,111, which is a division of Ser. No. 17,674, Feb. 24, 1987, Pat. No. 4,702,868.

[51] Int. Cl.$^5$ ................. C08J 9/224; C08J 9/232
[52] U.S. Cl. .................. 527/60; 521/56; 521/58; 521/59; 521/182; 521/184; 521/189
[58] Field of Search ............. 521/56, 60, 57, 58, 521/59

[56] References Cited

U.S. PATENT DOCUMENTS

| | | | |
|---|---|---|---|
| 2,787,809 | 1/1957 | Stastny | 18/48 |
| 2,871,218 | 1/1959 | Schollenberger | 260/45.4 |
| 3,015,650 | 1/1962 | Schollenberger | 260/75 |
| 3,214,411 | 10/1965 | Saunders | 260/75 |
| 3,233,025 | 2/1966 | Frye | 264/176 |
| 3,250,730 | 5/1966 | Palmer | 260/2.5 |
| 3,278,658 | 10/1966 | Immel | 264/51 |
| 3,413,244 | 11/1968 | Landler et al. | 260/2.5 |
| 3,446,781 | 5/1969 | Brownswood | 260/75 |
| 3,504,068 | 3/1970 | Zizsperger et al. | 521/135 |
| 3,632,845 | 1/1972 | Brownswood | 260/74 |
| 3,644,230 | 2/1972 | Cronin et al. | 260/2.5 E |
| 3,646,155 | 2/1972 | Scott et al. | 260/2.5 E |
| 3,646,166 | 2/1972 | Canter et al. | 260/879 |
| 3,657,165 | 4/1972 | Kawa et al. | 260/2.5 E |
| 3,766,099 | 10/1973 | Kawa et al. | 260/2.5 E |
| 3,769,245 | 10/1973 | Stewart | 260/2.5 AM |
| 3,843,757 | 10/1974 | Ehrenfreund | 264/2.5 AM |
| 3,953,558 | 4/1976 | Hatano et al. | 264/22 |
| 3,960,792 | 6/1976 | Nakamura | 260/2.5 E |
| 3,992,501 | 11/1976 | Toatzel et al. | 264/126 |
| 4,032,609 | 6/1977 | Smith | 264/53 |
| 4,117,195 | 9/1978 | Swarbrick et al. | 428/379 |
| 4,160,072 | 7/1979 | Shinkai et al. | 521/86 |
| 4,168,353 | 9/1979 | Kitamori | 521/59 |

(List continued on next page.)

FOREIGN PATENT DOCUMENTS

| | | |
|---|---|---|
| 01944 | 5/1985 | PCT Int'l Appl. |
| 1286460 | 8/1972 | United Kingdom. |
| 1408154 | 10/1975 | United Kingdom. |

OTHER PUBLICATIONS

Kirk-Othmer, *Encyclopedia of Chemical Technology*, (3rd Edition), vol. 16, pp. 385–420, (John Wiley & Sons, NYC, 1979).
Kirk-Othmer, *Encyclopedia of Chemical Technology*, (3rd Edition), vol. 8, pp. 626–640.
*Modern Plastics Encyclopedia*, (1986-87 Edition), pp. 52–62.
*Encyclopedia of Polymer Science & Technology*, vol. 7, (Wiley & Sons, NYC, 1979).
*Encyclopedia of Polymer Science & Technology*, vol. 6, pp. 522–564, (John Wiley & Sons, NYC 1986).
*Chemical Abstracts*, vol. 101, 1984, p. 38, (Columbus, Ohio, U.S.), See p. 38, Abstract 56072w, & JP, A, 5951925, (Chisso Corp.), Mar. 26, 1984.

*Primary Examiner*—Morton Foelak
*Attorney, Agent, or Firm*—Fisher, Christen & Sabol

[57] ABSTRACT

Moldable shrunken foam beads comprising a foamable thermoplastic polymer, preferably a silane-crosslinked polyolefin foam, are produced by mixing a composition comprising a silane-modified polyolefin (such as a silane-grafted polyethylene) and a silanol condensation catalyst in an extruder to produce a melt, then projecting a blowing agent into the melt at a rate effective to produce a desired foam density in the extrudate; extruding and cutting the melt to form foam beads; allowing the beads to shrink; and exposing the foam beads to moisture to produce silane crosslinking of the polyolefin foam. In certain other embodiments the crosslinking of the thermoplastic polymer can be omitted, and/or shrinkage of the beads produced by vacuum treatment.

22 Claims, 3 Drawing Sheets

Extrusion expanded polyethylene foam beads ( 9X )

U.S. PATENT DOCUMENTS

| | | | |
|---|---|---|---|
| 4,214,054 | 7/1980 | Watanabe | 521/94 |
| 4,217,319 | 8/1980 | Komori | 264/264 |
| 4,252,906 | 2/1981 | Hosokawa et al. | 521/86 |
| 4,275,023 | 6/1981 | Shimizu et al. | 521/56 |
| 4,278,628 | 7/1982 | Montgomery | 264/45.5 |
| 4,323,528 | 4/1982 | Collins | 264/52 |
| 4,333,898 | 6/1982 | Schmidtschen | 264/45.9 |
| 4,347,329 | 8/1982 | Park | 521/79 |
| 4,368,276 | 1/1983 | Pickerington | 521/79 |
| 4,399,087 | 8/1983 | Akiyama | 264/53 |
| 4,413,066 | 11/1983 | Isaka et al. | 521/149 |
| 4,424,180 | 1/1984 | Lalloz et al. | 264/51 |
| 4,436,840 | 3/1984 | Akiyama | 521/58 |
| 4,440,703 | 4/1984 | Akiyama et al. | 264/50 |
| 4,443,393 | 4/1984 | Akiyama | 264/53 |
| 4,446,254 | 5/1984 | Nakae et al. | 521/134 |
| 4,456,704 | 6/1984 | Fukumura et al. | 521/79 |
| 4,464,425 | 8/1984 | Bogt et al. | 264/DIG. 18 |
| 4,464,484 | 8/1984 | Yoshimura et al. | 521/60 |
| 4,483,809 | 11/1984 | Ando et al. | 246/5 |
| 4,504,601 | 3/1985 | Kuwabara et al. | 521/60 |
| 4,519,963 | 5/1985 | Yoshida et al. | 264/DIG. 18 |
| 4,526,930 | 7/1985 | Keogh | 525/105 |
| 4,528,300 | 7/1985 | Park | 521/79 |
| 4,540,718 | 9/1985 | Seuda et al. | 521/60 |
| 4,554,293 | 11/1985 | Park | 521/81 |
| 4,558,094 | 12/1985 | Deguchi et al. | 525/71 |
| 4,587,270 | 5/1986 | Kuwabara et al. | 521/60 |
| 4,596,833 | 6/1986 | Endo et al. | 521/143 |
| 4,598,100 | 7/1986 | Krutchen | 521/81 |
| 4,602,047 | 7/1986 | Endo et al. | 521/58 |
| 4,602,082 | 7/1986 | Akiyama et al. | 521/60 |
| 4,640,933 | 2/1987 | Park | 521/53 |
| 4,644,013 | 2/1987 | Fujie et al. | 521/60 |
| 4,657,937 | 4/1987 | Kuwabara et al. | 521/60 |
| 4,676,939 | 6/1987 | Kuwabara | 521/60 |
| 4,689,355 | 8/1987 | Treptow et al. | 521/60 |
| 4,702,868 | 10/1987 | Pontiff | 264/50 |
| 4,720,509 | 1/1988 | Nakamura | 521/60 |
| 4,727,093 | 2/1988 | Allen et al. | 521/180 |
| 4,748,191 | 5/1988 | Nakamura | 521/60 |
| 4,761,431 | 8/1988 | Nakamura | 521/60 |
| 4,762,860 | 8/1988 | Park | 521/143 |
| 4,778,829 | 10/1988 | Ichimura et al. | 521/60 |
| 4,812,484 | 3/1989 | Endo et al. | 521/60 |
| 4,861,531 | 8/1989 | Maeda | 521/60 |

Shrunken polyethylene foam beads of the invention ( 9X )

Extrusion expanded polyethelene foam beads ( 9X )

Commercial polyethylene foam beads,
density 1.9 pcf ( 9X O )

MOLDABLE SHRUNKEN THERMOPLASTIC POLYMER FOAM BEADS

REFERENCES TO RELATED APPLICATIONS

This application is a continuation-in-part of U.S. Ser. No. 073,642, filed July 15, 1987, now U.S. Pat. No. 4,870,111 which is a division of U.S. Ser. No. 017,674, filed Feb. 24, 1987, now U.S. Pat. No. 4,702,868, which is incorporated herein by reference in its entirety.

BACKGROUND OF THE INVENTION

1. Field of the Invention

The present invention concerns shrunken moldable beads of foamed thermoplastic polymers, e.g., polyolefins, and particularly beads of crosslinked polyolefins.

2. Description of the Prior Art

Foamable polystyrene beads are relatively easy to obtain and mold. Polystyrene resin is impregnated with an expanding agent, usually pentane, either during polymerization or resin particles are impregnated after polymerization. These particles are then subjected to steam to partially expand them. The pre-expanded beads are then fed to a mold and subjected to pressurized steam where they further expand, fuse together, and conform to the shape of the mold. Such moldings are useful as decoration, insulation, and protective packaging; however, expanded polystyrene moldings suffer from many disadvantages. Polystyrene exhibits poor solvent resistance and high temperature stability and, therefore, moldings made from polystyrene cannot be used for many applications. Expanded polystyrene foam is generally brittle, fragile and possesses poor cushioning properties which limits its use as protective packaging for fragile items such as computers and other delicate instrumentation. In addition, polystyrene foam does not stand up well to repeated impacts; usually the cushioning ability of the molding is severely impaired after just one impact.

Foams molded from polyolefin beads overcome many of the drawbacks of polystyrene foam. Generally available polyolefin foam beads are polypropylene or crosslinked polyethylene. Both of these materials possess greater solvent resistance than polystyrene and are also more resistant to high temperature. Polyolefin foam is much more resilient and flexible than polystyrene foam and, therefore, is of much greater use for the packaging of fragile items. It maintains much of its cushioning effect after even many impacts and therefore lends itself for use as packaging for long distance transport or for re-useable packages.

In the case of polyethylene, a substantially crystalline polymer, the temperature range for good molding of foam beads is quite narrow. If the molding temperature is too low, poor fusion will result and the molding will not possess optimum tear resistance and large voids or unfused pockets could exist in the molding. If the molding temperature is too high, the plastic becomes too flowable and the structural integrity of the foam is destroyed, resulting in a collapsed, misshapen molding.

To give the polyethylene a greater resistance to temperature and to widen the temperature range for molding, polyethylene is crosslinked. This allows the foam to be molded using steam as the heat source without being destroyed. Moldable crosslinked polyethylene foam beads are presently manufactured in several ways. Polyethylene beads containing a chemical crosslinking agent, such as dicumyl peroxide, can be suspended in an aqueous solution and heated to the proper temperature to trigger the crosslinking reaction. Polyethylene resin can also be crosslinked by subjecting the particles to high energy radiation, such as X-rays or electron beams.

The resultant crosslinked resin particles can then be impregnated with a hydrocarbon or chlorofluorocarbon blowing agent, such as butane, pentane, dichlorodifluoromethane, etc., by charging an aqueous suspension of the crosslinked polyethylene beads under pressure with the blowing agent. The solution is then heated and stirred in the autoclave to impregnate the beads with the blowing agent. Such processes are described in U.S. Pat. Nos. 4,399,087 and 4,436,840.

Because the blowing agent incorporated in the crosslinked polyethylene particles will readily dissipate, the expandable beads must either be stored under pressure or immediately pre-expanded, which is usually the case. The expansion ratio of these pre-expanded beads is usually between 10 and 45 to 1. Before molding, these beads are usually subjected to a pressurizing step where the beads are placed in a container which is charged with a pressurized gas, usually air or a chlorofluorocarbon/air mixture. Such processes are described in U.S. Pat. Nos. 4,399,087 and 4,443,393. This step raises the pressure of the gas inside the cells of the foam beads above atmospheric pressure to impart additional expandability needed during molding. The beads must be molded soon after this step or the additional pressure inside the cells of the beads will be dissipated.

In another method, low density polyethylene resin and a hydrocarbon or chlorofluorocarbon blowing agent are melt mixed and extruded into strands which are cut into beads. These beads are then exposed to high energy radiation to crosslink the polymer structure and impart the thermal resistance needed to easily mold the particles. These beads require special molding apparatus as no additional expandability is incorporated into the beads prior to molding.

The first (chemical) method of crosslinked polyethylene bead manufacture is disadvantageous in that a relatively large and expensive autoclave-type reactor is needed for blowing agent impregnation. This is also a batch process where a certain quantity of the moldable crosslinked polyethylene beads are manufactured at once and then this entire quantity of beads must be treated and/or stored. This requires large storage facilities. In addition, these beads must be pressure treated prior to molding to impart additional expandability to the foam. This process requires substantial time, as the beads will be destroyed or damaged if the pressurizing step is carried out too quickly. Therefore, large pressure containers are needed to perform this operation economically.

Using the second (radiation) process discussed, the crosslinked beads can be made on a relatively inexpensive extruder equipped with the proper equipment for granulating the foamed extrudate. However, to crosslink the foam, a relatively expensive and cumbersome radiation source is required. Generally, it is not feasible to perform the crosslinking step in a number of manufacturing locations but the process lends itself to one or several rather large, central manufacturing facilities. High energy radiation does not easily or quickly penetrate into the foamed plastic structure. Therefore, the degree of crosslinking can be much less on the inside portions of the foamed beads than on the outsides, which could cause the beads to possess deficient thermal resistance.

U.S. Pat. No. 3,413,244 discloses a process for producing cellular polyolefin products in which a particulate unfoamed polyolefin is foamed within a mold and is simultaneously grafted and crosslinked by units of compounds containing two non-conjugated ethylenically-unsaturated double bonds.

International Application No. PCT/FI84/00079, International Publication Number WO 85/01944, discloses foamed, silane-crosslinked polyolefin foam cable coverings which are described as relatively hard and rigid and are produced by extruding a mixture containing polyethylene, a silane hydrolyzable with water, a condensing catalyst and a foaming agent such as water.

U.S. Pat. No. 4,333,898 discloses a method for production of relatively high density foamed polymers (such as polyethylene) in which the polymer is mixed with a silane, which grafts thereto, then extruded to provide a jacket for a cable or the like, with a moist inert gas being injected into the extruder just prior to extrusion to cause the polymer to foam and the silane-grafted polymer to crosslink.

U.S. Pat. No. 4,456,704 discloses a method for producing crosslinked polyethylene foams which comprises mixing a polyolefin resin, a blowing agent, and optionally, a surface active agent, the polyolefin resin containing a crosslinkable ethylene polymer having on the side chains thereof silyl groups which effect crosslinking upon contact with water; extruding the mixture into a low pressure zone where the resulting extrudate, e.g., sheet, is allowed to expand, and bringing the expanded extrudate into contact with a silanol condensing catalyst so that the expanded extrudate is crosslinked upon contact with water.

None of these patents disclose a process for the extrusion of a silane-modified polyolefin containing a silanol condensation catalyst, with a blowing agent being injected to produce moldable shrunken foamed beads which crosslink internally when exposed to moisture.

A wide variety of thermoplastic polymers have been used in the preparation of foams which are moldable into various shapes, either directly or through the use of moldable beads, pellets or the like. See, e.g., U.S. Pat. No. 4,323,528 of Collins, assigned to the predecessor of applicant's present assignee, describing the use of polystyrene, high and low density polyethylene, and polyvinyl chloride.

Pellets of thermoplastic polymeric foams have been produced which do not require the usual pressurization or crushing prior to molding (a process sometimes referred to as "atmospheric molding"). For example, in Ando's U.S. Pat. No. 4,483,809 (assigned to Kanegafushi) small crosslinked polyethylene particles are fed to an autoclave equipped with a stirring device. The particles are dispersed in water with the aid of some dispersants to prevent flocculation of the particles. A blowing agent is added in the proper amount. The temperature and pressure of the autoclave are raised as the dispersion is stirred. It is held at a temperature and pressure for the time required to effect absorption of the blowing agent into the softened polyethylene. The autoclave is then opened and the beads foam as they are ejected. According to the patent, the beads are then subjected to an "expansion ratio adjustment" step to make them moldable without the usual pressurization or crushing step required for molding polyethylene beads. In this step they are heat treated so as to relax the polymer constituting the cell walls so the beads reduce in size. The resulting beads do not appear shrunken but maintain a spherical shape and smooth skin and the cells appear to be fully inflated. During this "shrinkage" process, each cell in the foam could be likened to a balloon which is losing some of its inflatant—it maintains its general shape, but merely becomes smaller. The Kanegafuchi process is essentially a two-step process, first bead manufacturing and then an expansion ratio adjustment step, with the additional factor that a specially formed resin particle is the basic raw material. Such small, round particles are not the form of the usual commercially available polyethylene or polypropylene resins. In the case of low density polyethylene, this resin must be crosslinked, either by radiation or by chemical addition (before particle formation).

See also U.S. Pat. No. 3,766,099, which discloses the production of ethylenic resin foams by using volatile organic foaming agents to form flowable gels which can be extruded to form the foam. According to this patent, with the use of certain foaming agents whose gas permeability through the polymeric membranes forming the cell walls of freshly-extruded foam exceeds the corresponding permeability of air, the cells will soon become collapsed by atmospheric pressure, with the result that uneven wrinkles and hollows form on the surfaces of the foam. The patent discloses that the foaming agent can be selected or blended to adjust its gas permeability through the cell walls of the foam and prevent such shrinkage or collapse of the foam. Various foam controlling agents can be used to control the cell size of the foams. The production of moldable foam beads is not disclosed.

Similarly, U.S. Pat. No. 3,644,230 discloses an improved foam extrusion process in which surfactants such as partial esters of fatty acids are used to reduce or prevent the collapse or shrinkage of closed-cell foam structures following extrusion. The production of moldable foam beads is not disclosed.

Improved methods of producing moldable beads of foamed thermoplastic polymers such as polyolefins, e.g., polyethylenes, are clearly needed; for example, methods which would not require pressure treatment or radiation. Furthermore, moldable beads which need not be pressurized or crushed prior to molding are needed to simplify various molding processes and to make them more economical.

SUMMARY OF THE INVENTION

It is an object of this invention to produce moldable shrunken thermoplastic polymer foam beads using relatively simple, inexpensive apparatus. It is also an object to be able to produce the beads economically at any desired location in any desired quantity.

In accordance with the present invention, moldable shrunken thermoplastic polymer foam beads can be produced by processes including extrusion foaming with a blowing agent (either a solid material which decomposes to form a gas or a volatile hydrocarbon, halogenated hydrocarbon or inert gas) or vacuum treatment subsequent to formation of the beads. The beads are reduced in size non-uniformly, so that the surface layer or skin forms wrinkles, dimples, hollows or the like. The beads can be produced from any suitable foamable thermoplastic polymer, including polyolefins such as polyethylene, polyvinyl polymers such as polyvinyl halides, alkenyl aromatic polymers such as polystyrenes, polycarbonates, thermoplastic elastomers such as synthetic rubbers, polyphenylene ethers, polyesters such as polyethylene terephthalate, polyamides such as nylon, fluorocarbon polymers such as polytetrafluoroethylene, polyetherimides and mixtures thereof. The beads are preferably produced by a process comprising the steps of:

(a) mixing a composition comprising a thermoplastic foamable polymer in an extruder to form a melt;

(b) injecting a blowing agent into said melt at a rate effective to produce the desired foam density in the extrudate;

(c) extruding and cutting the melt to form foam beads;

(d) allowing the beads to shrink to a predetermined density; and, optionally, (e) treating the beads to crosslink the thermoplastic polymer foam by chemical means or electromagnetic radiation.

Preferably, the type of blowing agent and the rate of injection thereof are sufficient to produce beads with an amount of shrinkage which is effective to produce a predetermined expansion ratio in thermal expansion molding, for example from about 1.1 to about 2.5. The foam should preferably shrink promptly after extrusion and cutting, within less than about one hour, more preferably within less than about 30 minutes, or most preferably within less than about 15 minutes. Since the time required for shrinkage appears related to the relative permeability of the polymer foam cell walls to the blowing agent and air, permeability adjustment additives can be added to the polymer to adjust the permeability and thus the amount of shrinkage and the time required for shrinkage. The resulting beads are preferably crosslinked in optional step (e) above to the extent that the beads are heat stable enough to be molded by the application of heat and pressure and shrunken enough to provide a predetermined expansion ratio in thermal atmospheric molding.

Although the method described above in which the permeability of the polymer foam cell walls is sufficient to allow the blowing agent to escape promptly and the beads to shrink as a result is presently preferred, similar beads can be obtained by exposing the beads to an atmosphere below ambient pressure for a period of time effective to remove a portion of the blowing agent and/or air from the foam, thereafter exposing the beads to ambient pressure to cause them to shrink.

Although the moldable shrunken foam beads can be pressurized or crushed before being loaded into a mold for thermal molding, their principal advantage is that they can be loaded directly into a mold at atmospheric pressure without such steps being necessary. Heat and pressure are then applied, as by the introduction of a heated gas at a temperature and pressure effective to soften the polymer foam, with the result that the softened beads expand so that they fuse together and conform to the shape of the mold to form a molded article of a predetermined density. As such moldings typically shrink slightly on removal from the mold and cooling, the articles can be subjected to an annealing process involving heat treatment to make the size and shape of the subsequently cooled molded article more closely conform to the shape and size of the interior of the mold.

In accordance with a preferred embodiment of the present invention, moldable shrunken silane-crosslinked polyolefin foam beads are produced. The polyolefin is preferably selected from the group consisting of medium density polyethylene, low density polyethylene, linear low density polyethylene, polypropylene, polybutylene, and copolymers of olefin monomers having from 2 to about 8 carbon atoms, and most preferably is low density or linear low density polyethylene.

Further in accordance with the invention, moldable shrunken foam beads comprising a silane-crosslinked polyolefin foam are produced by a process comprising the steps of:

(a) mixing a composition comprising a silane-modified polyolefin and a silanol condensation catalyst in an extruder to produce a melt;

(b) injecting a blowing agent into the melt at a rate effective to produce the desired foam density in the extrudate;

(c) extruding and cutting the melt to form foam beads, (d) allowing the beads to shrink, and (e) exposing the foam beads to moisture to produce silane crosslinking of the polyolefin foam.

The blowing agent injected in all these embodiments can be selected from volatile hydrocarbons, halogenated hydrocarbons and compressed inert gases. Alternatively, instead of injecting such a blowing agent in step (b), a solid blowing agent can be mixed into the composition in step (a). As an alternative to the use of silane-modified polyolefins in step (a), such raw materials can be formed in situ as the ingredients are mixed and melted by mixing effective amounts of a composition comprising at least one polyolefin with a silane compound containing at least one unsaturated group, a free radical initiator and a silanol condensation catalyst in the extruder.

Still further in accordance with the invention, processes are provided for molding solid foam articles from moldable shrunken foam beads prepared in accordance with the above processes, by the application of heat and pressure in a mold.

BRIEF DESCRIPTION OF THE FIGURES

Certain aspects of the present invention as compared to the prior art are illustrated by the figures, in which.

Figure 1:
FIG. 1 is a photomicrograph of shrunken polyethylene foam beads produced in accordance with the invention.
Figure 2:
FIG. 2 is a photomicrograph of extrusion-expanded polyethylene foam beads which were not allowed to shrink significantly following expansion.
Figure 3:
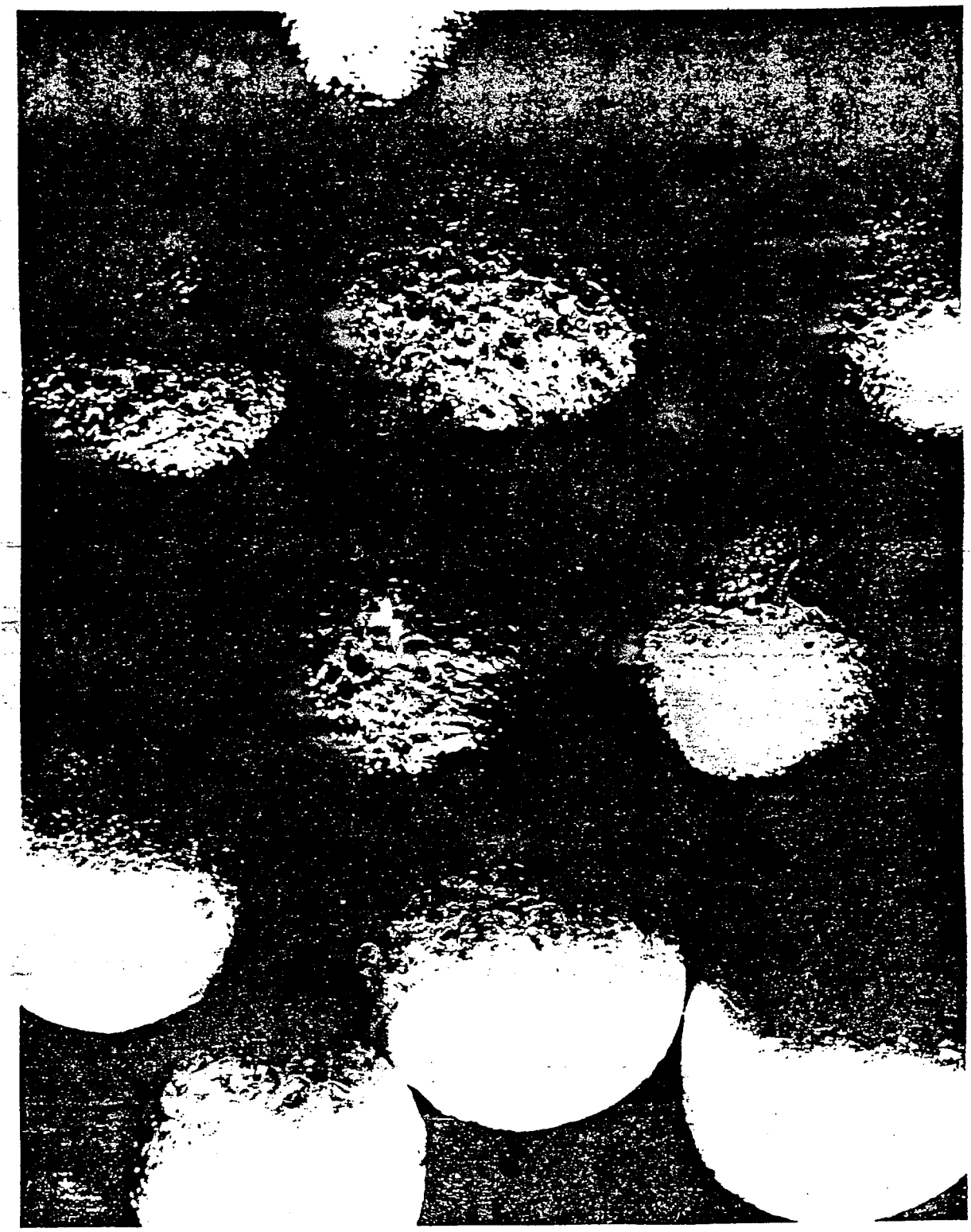
FIG. 3 is a photomicrograph of commercially available "Eperan" polyethylene foam beads (density 1.9 pcf or 30.4 kg/m$^3$) produced by Kanegafuchi in accordance with Ando's U.S. Pat. No. 4,483,809.

The beads in FIGS. 1, 2 and 3 are all shown at magnifications of approximately 9X.

Further aspects and advantages of the present invention will be apparent from perusal of the following detailed description and the appended claims, which alone limit the scope of the invention.

DETAILED DESCRIPTION OF THE INVENTION

In accordance with the present invention, moldable shrunken thermoplastic polymer foam beads are produced using conventional extruder apparatus having suitable means for heating and cooling, with a blowing agent injected into the polymer melt or introduced in solid form. Although the invention will be discussed in detail in the context of the silane-crosslinked polyolefin polymers which are presently preferred, it should be understood that any suitable foamable thermoplastic polymer can be employed for the production of moldable shrunken foam beads in accordance with the invention, with proper consideration for the relative permeability to various blowing agents and foaming properties of each polymer. For the purposes of the present invention, a foamable polymer is defined as one which can be admixed with a blowing agent to form a gel which will produce a substantially closed-cell foam by means of extrusion, autoclave impregnation or other commercial foaming methods. Only closed-cell foams can be shrunk to form moldable beads in accordance with the present invention.

For example, U.S. Pat. No. 3,843,757 discloses various extrusion-foamable thermoplastic resins, including chlorinated rubber, cellulose ethers and esters, vinyl halides, vinyl esters and vinyl ethers, homopolymers and copolymers of various olefins and vinyl halides, unsaturated carboxylic acids and derivatives thereof, polycarbonates, nylons, polyesters such as polyethylene terephthalate, acrylonitride-butadiene-styrene (ABS) terpolymers and fluorocarbon polymers such as polytetrafluoroethylene. Suitable polymers include various alkenyl aromatic polymer resins such as foamable polystyrenes, exemplified by those disclosed in U.S. Pat. Nos. 4,681,715, 4,727,093 and 3,817,669, including polystyrene copolymers such as "high impact" polystyrenes and homopolymers of vinylidene aromatic hydrocarbons and ring-halogenated derivatives thereof as disclosed in U.S. Pat. No. 3,843,757; polyolefins as disclosed in detail below and polyvinyl polymers such as polyvinyl halides as disclosed in U.S. Pat. No. 3,843,757. Thermoplastic elastomer polymers (sometimes referred to as elastoplastics) can be employed, including styrene-diene block copolymers, thermoplastic urethanes and copolyester ethers as disclosed in the Kirk-Othmer Encyclopedia of Chemical Technology, Third Ed., Vol. 8, pp. 626–40 (John Wiley & Sons, New York 1979), certain copolymers of polyolefins with butadiene and the like as disclosed below, and various synthetic rubbers. Kirk-Othmer discloses styrene-diene block copolymers, thermoplastic urethanes and copolyester ethers. The thermoplastic polyurethanes are produced by linking three basic components—a linear, hydroxyl-terminated polyol selected from polyesters (e.g., adipates, azelates, isophthalates and caprolactone) and polyethers (e.g., polypropylene or polytetramethylene ether glycols); an aromatic or non-aromatic diisocyanate, and a low molecular weight glycol as a chain extender. The preparation of such materials is described in U.S. Pat. Nos. 2,871,218; 3,015,650; 3,214,411; 3,233,025; 3,632,845; 3,446,781 and 3,769,245. The thermoplastic copolyester-ether elastomers are segmented copolymers derived from terephthalic acid, polytetramethylene ether glycol and 1,4-butane diol. One family is available commercially from DuPont under the trade name Hytrel ®. Ethylene-propylene elastomers (copolymers and terpolymers) are disclosed in Mark et al., Encyclopedia of Polymer Science and Engineering, Vol. 6, pp. 522–64 (John Wiley & Sons, NYC, 1986). Polyphenylene ethers and blends thereof with polystyrenes, as disclosed in U.S. Pat. No. 4,727,093, can also be used. Polyetherimides which are useful in the invention are disclosed in U.S. Pat. No. 4,598,100. The methods of the present invention can be used with any suitable extrusion-foamable thermoplastic resin to produce extrusion-foamed shrunken foam beads which are readily moldable by "thermal atmospheric" molding, i.e., without the necessity of crushing or pressurization in filling the mold with the beads. These patents and publications disclosing suitable foamable thermoplastic polymers are incorporated herein by reference.

Through proper choice of blowing agents, cell size, and curing additives, the foam beads of the present invention typically shrink within about 15 minutes after extrusion and cutting. The "shrunken" foam beads of the present invention are thus defined as being reduced from their maximum expansion to produce surface wrinkles, dimples or the like, as described below. The shrinkage occurs because of the blowing agent's rapid diffusion from the foam structure relative to its replacement with air and/or the low room temperature vapor pressure of the blowing agents causing a decrease in volume of the cells as cooling progresses. This occurs as part of the extrusion process during storage. The resulting foam beads appear shrunken and collapsed, as shown in FIG. 1. Each cell of the foam can be likened to a beach ball being popped and losing air; the volume decreases, but the "skin" remains, with its original surface area containing wrinkles, dimples or the like. This process is composed of only one step. Additionally, readily available resins can be used and no pre-crosslinking step is required for low density polyethylene. In contrast, FIG. 2 illustrates that expanded foam beads which are not allowed to shrink have contours which are substantially unchanged from the original "pill" shapes, with a surface which is regular and only slightly dimpled. Such beads can be vacuum-treated to produce shrunken beads useful in the present invention. Although the process is not as rapid as those in which the freshly extruded and cut beads are caused to shrink rapidly, and additional equipment is required, the shrunken foam beads of the present invention can also be produced by subjecting freshly extruded and cut beads to subatmospheric pressure for a time effective to cause them to expand at least slightly and a substantial portion of the blowing agent and air to escape the cells (thus reducing the internal pressure), then subjecting the resulting "overexpanded" beads to atmospheric pressure, where they readily shrink and stabilize in this shrunken configuration. For any given combination of polymer and blowing agent, a suitable reduced pressure and time of application can be selected to produce shrinkage which will produce the desired molding expansion ratio. For example, subatmospheric pressures ranging from about 15 to 30 inches of mercury can be employed, preferably from about 15 to 25, for times of up to about 48 hours or even more, but preferably less than about 24 hours and more preferably less than about 12 hours.

FIG. 3 illustrates that the commercial products of Kanegafuchi which are apparently produced in accordance with U.S. Pat. No. 4,483,809 by heat treatment to reduce their size, are substantially spherical in shape, vary somewhat in size, and have surfaces which are substantially smooth and glossy in appearance, revealing slight dimpling only under magnification. The following nonlimiting theory may explain why and how beads disclosed by Ando in the Kanegafuchi U.S. Pat. No. 4,483,809 and the shrunken beads of the present invention both can expand during the molding process. The Kanegafuchi beads are heated so as to shrink them. Before heating, the polymer films comprising the cell walls are oriented. If untreated beads were molded, little expansion would occur because the cell walls, when oriented, are very difficult to stretch and thus the air contained in the cells cannot easily thermally expand. The process of treating the beads by heating (reducing their size uniformly), however, causes the polymer in the cell walls to become unoriented. Unoriented plastic is much easier to stretch than oriented plastic. The air in the cells of the treated beads will expand in accordance with the ideal gas law (PV=nRT) when exposed to the heat of molding. It can be predicted that the beads will expand easily only to their pre-treated volume as, at this point, the cell walls would again be sufficiently oriented to inhibit further expansion.

The shrunken beads of the present invention differ from such "reduced" beads in several ways. As they are foamed, the expansion continues until the "orientation strength" of the cell walls equals the expansion strength of the blowing agent. The beads then begin to shrink as either (or both) the blowing agent permeates out of the foam or the blowing agent tends to condense. This shrinkage, or collapse, leaves the cell walls in the oriented condition. When these shrunken beads are exposed to the heat of molding, the remaining air in the cells expands on a nearly unrestricted basis, similar to inflating a collapsed beach ball. Such expansion will continue easily until the cells are fully inflated and further expansion would require stretching of the oriented films making up the cell walls. Both types of beads will produce moldings which collapse slightly after molding, due to the falling temperature according to the ideal gas law (PV=nRT) but will reinflate and assume the shape of the interior of the mold when annealed in an oven at an elevated temperature, e.g., about 150°–200° F. for polyethylene.

The required annealing temperature for moldings of most foamable polymers is within a range below the melting point of the polymer so that the polymer is soft enough to expand, but sufficient to increase the rate of permeation of air back into the cells to keep them inflated. The thermal energy (steam pressure) required for molding of the shrunken beads should be less than for the "reduced" beads, as there is no "stretching" of polymer film required to expand the cells. The reduced beads require that the unoriented cell walls be stretched and oriented in expansion, which should require more energy. This makes the shrunken beads of the present invention potentially more economical to mold.

Crosslinking of the polyolefin resin (when used) is preferably carried out after extrusion when the polyolefin is brought into contact with moisture. A silane-modified polyolefin resin is preferably used, such as a polyethylene which contains carbon-bonded silyl groups. This silated resin is melt mixed in the extruder with the proper amount of a silanol condensation catalyst. A plastic product made in this manner will crosslink when contacted with water, such as moisture in the atmosphere. For resins lacking such silane components, any suitable chemical crosslinking agent, or electromagnetic radiation of a suitable frequency and energy level, can be used.

In making the novel shrunken foam beads of this invention, the silane-grafted polyolefin resin, the condensation catalyst, talc or other nucleating agent for cell size control, and any other desired additives typically are added to the hopper of an extruder. The ingredients are melted, mixed and forwarded through the extruder. At a point in the extruder where all of the ingredients are well mixed and fully melted, a blowing agent, preferably comprising a volatile organic compound, an inert gas or a mixture thereof, is injected under pressure into the molten polymer mix. The blowing agent and polymer are sufficiently mixed and cooled to the proper foaming temperature. The foamable melt is then extruded through a die plate containing a number of small holes.

The resultant foam strands are cut as they emerge from the die so that they are cut while the foam is still expanding. In this manner, beads are produced, forming substantially closed cells with a thin skin present on the entire surface of each bead. As the beads cool, they will shrink rapidly (preferably within about 15 minutes, at the most within about one hour), provided that the proper balance between cell size, permeability of the foam cell walls to air and other blowing agent properties is present. Various materials commonly used as anti-aging additives for thermoplastic polymers can be included in the polymer mixture to adjust the relative permeability of the cell walls to the blowing agent to a higher or lower value, as compared to air, as described below. The permeation rate of air and/or a blowing agent through the polymer material can be measured according to ASTM D-1434 with the test gas at a pressure of one atmosphere, or the equilibrium vapor pressure of the gas at 23° C. if its boiling point is greater than 23° C. The crosslinking of the polyolefin then commences with exposure to the moisture present in the ambient atmosphere. The beads can be collected after cutting and conveyed to a suitable storage area, such as a porous bag, and held until the crosslinking reaction has proceeded to the extent that the crosslinked polyolefin beads are heat stable enough to be molded.

In the practice of the present invention, for the particular foamable thermoplastic polymer which is to be used to prepare moldable foam beads, the blowing agent and rate of injection thereof, additives for permeability adjustment and cell size adjustment are all selected to allow production of expanded foam beads which shrink a predetermined amount within a maximum time, normally less than about one hour. The predetermined amount of shrinkage is that which will produce the desired expansion ratio in thermal atmospheric molding, normally in the range of from about 1.1 to 4, preferably 1.1 to 2.5, and most preferably from 1.5 to 2.4. The expansion ratio can be calculated by dividing the density of the individual foam beads by the density of the finished molding. The predetermined expansion ratios selected are those which will produce satisfactory moldings from the specific polymers employed in thermal atmospheric molding.

Using the process of the present invention, shrunken, crosslinked polyolefin foam beads having densities in the range of from about 0.8 to about 20 pounds per cubic foot (12.8 to 320 kg.m$^{-3}$) are produced. The beads preferably have densities in the range of from about 1.2 to about 12 pounds per cubic foot (19.2 to 192 kg.m$^{-3}$), and most preferably from about 2 to about 10 pounds per cubic foot (32 to 160 kg.m$^{-3}$). Beads used to produce higher density moldings preferably have densities in the range of from about 12 to about 20 pounds per cubic foot (192 to 320 kg.m$^{-3}$). Shrunken foam beads of other polymers can also be produced with these densities.

The primary raw materials presently preferred for this process are silane-grafted low density polyethylene resins. Processes for the production of such resins are described in U.S. Pat. Nos. 3,646,155; 4,117,195; and 4,526,930. Generally, a silane is grafted to the base low density polyethylene resin. In an extruder or other compounding mixer, such as Brabender mixer, a free radical generator, such as dicumyl peroxide, and a silane, such as vinyltrimethoxysilane, and the base low density polyethylene resin are melt mixed. The silyl groups are grafted to the polyethylene in this way. The pendant silyl groups will form crosslinks between the polymer chains when exposed to moisture in the presence of an organometallic silanol condensation catalyst, for example an organotin ester such as dibutyl tin dilaurate.

The catalyst may be combined with the polyethylene resin, silane, and free radical generator in a second step, in which the final moisture curable product is formed. The catalyst may also be combined with the polyethylene resin, silane, and free radical generator in one extrusion or mixing step, as in the Monosil ® process of The Swiss Maillefer Company. In the case of the two step process, Dow Corning's Siopla ® (U.S. Pat. No. 3,646,155) process, silane grafted polyethylene resins and a catalyst master batch, a dispersion of the catalyst in polyethylene resin, can be readily purchased. These two products are then mixed in the proper proportions and processed as desired to form a moisture curable product. Silane-grafted polyethylene resins and catalysts are also available from Synergistics Chemicals, Ltd. of Mississauga, Ontario, Canada, under the trade names Syncure ® 1019-A for the silane grafted resin and Syncure ® 1000-B for the catalyst master batch.

In another two-step process, a moisture-crosslinkable polyethylene such as a silane-ethylene copolymer is mixed with a catalyst master-batch. Such materials are marketed by BP Performance Polymers under the trademarks SLPE ® and MCA 360 TM for the silane ethylene copolymer and catalyst master batch, respectively, and are said to offer various advantages over the use of one-step silane processes, peroxide crosslinking processes or silane grafted low density polyethylene. Other polyethylene-silane copolymers and catalyst master batches are available from Union Carbide Corporation, Danbury, CT, as DFDA 1594 and DEFD 1702, respectively.

The final resin/additive mixture is fed into the hopper of an extruder. At a point in the extruder where the plastic components of the resin mixture are fully melted, the blowing agent is injected. The blowing agent used is typically a hydrocarbon or chlorofluorocarbon such as butane, pentane, dichlorodifluoromethane, dichlorotetrafluoroethane, chlorodifluoromethane, or mixtures thereof. Other possible blowing agents are described below. The blowing agent is injected at a rate effective to give the desired foam density, usually as about 5 to 70, preferably 10 to 40, and most preferably 25 to 40 weight percent of the total foam output rate. The proper temperature for foaming depends upon the melting point of the polymer and the type of blowing agent used, but is generally in the range of from about 175 to about 340° F. (79.5° to 171.1° C.), preferably from about 190 to about 240° F. (87.8° to 115.6° C.) when ethylene polymers are used. Hydrocarbons and halogenated hydrocarbons which are at least partially soluble in the polyolefin resins used have a plasticizing effect on the melt, reducing the frictional heat generated. Furthermore, due to the latent heat of vaporization, these materials have a cooling effect during foaming as the blowing agent vaporizes. The foaming temperature should be maintained within the desired range by the use of external cooling means in conjunction with a rate of flow of the blowing agent effective to provide additional cooling effects.

In the extruder, the resin/additive/blowing agent mixture is mixed sufficiently and cooled to the proper foaming temperature. The extruder is equipped with a die with many small holes. The foamable mixture is extruded through these holes and cut by a rapidly rotating knife which cuts the extrudate into small beads. If a cylindrical rotor containing one or more blades is used, the holes on the die are arranged in a straight line so that they can be cut by the rotor at its closest point to the die. If a propeller-type knife is used, the holes on the die are arranged in a circle so that the extrudate will be cut as the knife rotates about its center axis. Because the rate at which the foam emerges from the die is not easily controlled, the size of the beads is determined by the size of the holes on the die plate and the speed of the rotating knife.

As the beads are cut at the die face, they fall into a collection bin where they can be drawn out pneumatically or by other suitable means and conveyed to a collection area, preferably a breathable bag which will allow air to pass through fairly easily. The expanded beads in storage will promptly shrink and then crosslink through contact with the moisture contained in the air. The blowing agent will generally dissipate within about 24 hours or less. After about three days, the crosslinking generally has proceeded enough to impart to the foam beads the thermal resistance which aids in molding. Any additional exposure of the beads to moisture prior to molding will help accelerate crosslinking. Such exposure could include conveying the beads from the cutter using water with subsequent drying prior to bag storage or blowing moist air through the storage bag during bead storage and aging. Although not required for moldability of the shrunken beads, crosslinking is preferred for beads which are to be used for molding complex parts or parts with close physical tolerances, as it widens the "window" of acceptable temperatures for molding.

The silane-modified polyolefin foam or other polymer foam should preferably be crosslinked at least enough to make the foam beads thermally stable in the molding process. Higher proportions of crosslinking can be used to produce beads and molded objects having firmer textures. Generally, the percentage crosslinking or gel content should range from about 5 to about 85 percent, preferably from about 8 to about 60 percent as measured by ASTM D-2765. However, the shrunken thermoplastic polymer beads which are uncrosslinked are also moldable.

The above described process for the manufacture of moldable crosslinked polyolefin foam beads possesses many advantages over other methods and processes used. The equipment used is relatively simple as compared to that required for the other processes. The primary equipment used is an extruder equipped with a blowing agent injection system and melt cooling capability. This type of extruder is well known to those with knowledge of thermoplastic polymer foam manufacture. The machinery which converts the foam strands to beads is a simple cutter which is very similar to those used for strand pelletizers or dicers. The crosslinking method used is preferably silane crosslinking, in which the silane-modified polyolefin resin such as a silane-grafted polyolefin resin is processed in the same manner as a normal polyolefin. This method of crosslinking eliminates the need for a high energy radiation source for crosslinking and will give more uniform crosslinking throughout the foam in comparison to the radiation method, as radiation does not easily penetrate the relatively thick (⅛"-½" or 0.3 to 1.27 cm) foam. The beads made by this process are expanded from the extruder, then shrunk to produce moldable beads, which eliminates the need for large autoclave type reactors. The use of silane crosslinking eliminates the need for a pre-processing crosslinking step. The beads made in this manner do not require the pre-molding pressurizing step used in the autoclave blowing agent impregnation process.

The entire system needed to make these moldable crosslinked polyolefin beads can be installed at the molding facility and sized according to the molder's needs. Using this machinery, the molder can produce the needed quantity of beads to fill his orders. As such moisture-activated crosslinking does require several days to take place, some storage time and space are required, but much less than the storage time and space involved with large volume shipments of expanded beads. Having the bead manufacturing equipment at the molding site eliminates the high cost associated with shipping large quantities of the bulky, low density beads. The molder has complete control over moldable bead specifications, such as density, color, additives, crosslinked level, etc., and these can be changed relatively easily. A further advantage of the shrunken foam beads is that they have an indefinite shelf life for molding.

In the production of the silane-crosslinked polyolefin foam beads of the present invention, silane-modified polyolefins are used, selected from homopolymers and copolymers of ethylenically-unsaturated monomers having from 2 to about 8 carbon atoms, such as ethylene, propylene, butenes, pentenes, hexenes and the like. The copolymers can include other compatible monomers, as described below. Presently, the polyethylene-type polymers are preferred, and such polymers are referred to in the disclosure and examples below, but this should be regarded as exemplary of the invention rather than limiting in any sense. Particularly preferred are the polyethylenes, including medium density polyethylene, low density polyethylene, and linear low density polyethylene. Such polyethylenes are described in the Kirk-Othmer *Encyclopedia of Chemical Technology*, Third Ed., Vol. 16, pages 385-420, the *Modern Plastics Encyclopedia* 1986-87, pages 52-63 and in the *Encyclopedia of Polymer Science and Technology*, Vol. 7, page 610.

The term "silane-modified polyethylene resin," as used in the present specification and the appended claims, denotes a modified polyethylene resin obtained by chemically bonding a silane compound containing at least one unsaturated group to a polyethylene-type resin in the presence of a radical generator, as disclosed, for example, in U.S Pat. No. 4,160,072.

The term "polyethylene resin," as used in the present specification and the appended claims, is meant to include not only homopolymers of ethylene, but also ethylene copolymers composed of at least 50 mole percent, preferably at least 70 mole percent, of an ethylene unit and a minor proportion of a monomer copolymerizable with ethylene, and blends of at least 50 percent by weight, preferably at least 60 percent by weight, of the ethylene homopolymer or copolymer with another compatible polymer.

Examples of monomers copolymerizable with ethylene and other olefins are vinyl acetate, vinyl chloride, propylene, butene, hexene, acrylic acid and its esters, and methacrylic acid and its esters. The other polymer that can be blended with the ethylene homopolymer or copolymer may be any polymer compatible with it. Examples are polypropylene, polybutadiene, polyisoprene, polychloroprene, chlorinated polyethylene, high density polyethylenes, polyvinyl chloride, a styrene/butadiene copolymer, a vinyl acetate/ethylene copolymer, an acrylonitrile/ butadiene copolymer, a vinyl chloride/vinyl acetate copolymer, etc. Especially preferred species are polypropylene, polybutadiene and styrene/butadiene copolymer.

Examples of polyethylene resins that can be advantageously employed in the present invention are low-, medium- and high-density polyethylenes, an ethylene/vinyl acetate copolymer, an ethylene/propylene copolymer, copolymers of ethylene and methyl or ethyl acrylate, a blend of polyethylene and polypropylene, a blend of polyethylene and an ethylene/vinyl acetate copolymer, and a blend of polyethylene and an ethylene/propylene copolymer. Of these, the medium density polyethylenes, low density polyethylenes, and ethylene/propylene copolymers are especially suitable.

Preferably, the polyethylene resins have a softening point of less than 130° C. Furthermore, it is preferred that the polyethylene resin have a melt index of 0.2 to 20, preferably 0.3 to 6 decigrams per minute, and a density of 0.910 to 0.940, preferably 0.916 to 0.925 grams/cc.

In the present invention, the silane-modified polyolefin resin is prepared by chemically bonding a silane compound containing at least one unsaturated group to the polyolefin resin described above in the presence of a radical generator.

The silane compounds used in this invention are organosilicon compounds containing at least one unsaturated group capable of being chemically bonded to the sites of free radicals generated in the polymer chain of the polyolefin as a result of radical reaction, for example, the silane compounds described in U.S. Pat. No. 4,160,072, and typically include organosilane compounds of the following formula:

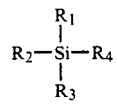

wherein one or two, preferably only one, of $R_1$, $R_2$, $R_3$ and $R_4$ represent a hydrocarbyl or hydrocarboxyl group containing a radical-polymerizable double bond, and the rest represent organic residues capable of being split off by hydrolysis.

In the above formula, examples of the hydrocarbyl group containing a radical-polymerizable double bond are vinyl, allyl, 2-methylallyl, butenyl, cyclohexenyl, cyclopentadienyl, and octadienyl, and examples of the hydrocarboxyl group containing a radical-polymerizable double bond include allyloxy and 2-methyl allyloxy. Other examples include:

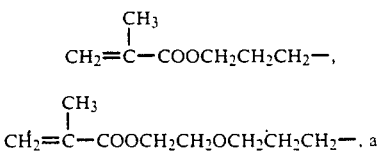

-continued

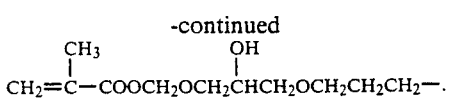

Of these, vinyl is most preferred.

Examples of the organic residues capable of being split off by hydrolysis include alkoxy groups such as methoxy, ethoxy or butoxy; acyloxy groups such as formyloxy, acetoxy or propionoxy; oxime groups such as:

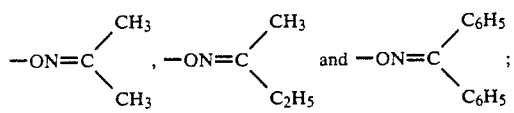

and substituted amino groups, for example, an alkyl amino or aryl amino group, such as methyl amino, ethyl amino or phenyl amino. Of these, the alkoxy groups are especially preferred.

The silane compound preferably contains three hydrolyzable organic groups.

Vinyl trimethoxysilane and vinyltriethoxysilane can be most conveniently used in the present invention.

The amount of the silane compound is not critical and can be varied widely according, for example, to the type of polyolefin resin, the desired degree of modification, and the reaction conditions. Generally, its amount is from about 0.1 to about 50 parts by weight, preferably about 0.3 to about 30 parts by weight, and most preferably about 0.5 to about 10 parts by weight, per 100 parts by weight of the polyethylene resin.

Advantageously, radical generators used in the reaction between the polyolefin resin and the silane compound are those which decompose upon heating and generate radicals. The radical generator acts as a reaction initiator at the time of chemically bonding the silane compound to the polyolefin resin. These radical generators generally have a half life of 6 minutes or less, preferably 3 minutes or less, and most preferably 1 minute or less, at the melt-kneading temperature of the polyolefin resin. Typical examples of such radical generators include organic peroxides such as benzoyl peroxide, dichlorobenzoyl peroxide, or lauroyl peroxide; organic peroxides such as t-butyl peracetate, t-butyl peroxy-2-ethyl hexanoate, or t-butyl peroxy isobutyrate, t-butyl peroxy benzoate, dicumyl peroxide, 2,5-dimethyl-2,5-di(t-butyl-peroxy)hexane, 2,5-dimethyl-2,5-di(t-butyl-peroxy)hexyne-3, di-t-butyl peroxide, 2,5-di(peroxybenzoate)hexyl-3 or 1,3-bis(t-butyl-peroxyisopropyl)benzene; and azo compounds such as azobisisobutyronitrile or dimethyl azodiisobutyrate. Dicumyl peroxide is presently most preferred.

In any situation, a specified radical generator is selected depending upon the temperature at which the polyolefin resin is reacted with the silane compound. For example, when the reaction is to be carried out at about 190° to 200° C., dicumyl peroxide, which has a half life of about 15 seconds at this temperature, is suitable. When the reaction is to be carried out at about 150° C., benzoyl peroxide, having a preferred half life at this temperature, is suitable.

The amount of the radical generator is not limited in particular, and can be varied over a wide range according, for example, to the type of the polyolefin resin used or the amount of the silane compound. Although the radical generator should be used in an amount sufficient for performing the desired degree of modification, it should not be used in amounts such that the ordinary crosslinking of the polyolefin resin becomes a main reaction mechanism. Generally, its suitable amount is 0.01 to 1.5 parts by weight, preferably 0.1 to 1 part by weight, per 100 parts by weight of the polyolefin resin.

The bonding of the silane compound to the polyolefin resin can be performed easily by the method to be described hereinbelow.

For example, the polyolefin resin, the radical generator, and the silane compound are fed into an extruder, and the radical generator is decomposed while melting the polyethylene resin, thereby chemically bonding the silane compound to the polyethylene resin.

All silanol condensation catalysts which are usually employed to form a crosslinkage in silanemodified polyolefin resins are feasible as the silanol condensation catalyst in this invention. Examples of the silanol condensation catalyst are organometallic compounds such as organotin compounds (e.g., esters such as dibutyltin dilaurate, stannous acetate, and stannous octanoate or stannous caprylate), lead naphthenate, zinc caprylate, iron 2-ethylhexanoate, cobalt naphthenate, and titanic acid esters and titanium chelate compounds [e.g., tetrabutyl titanate, tetranonyl titanate, or bis-(acetylacetonitrile)diisopropyl titanate]; organic bases such as ethylamine, hexylamine, dibutylamine or pyridine; acids such as inorganic acids (e.g., hydrochloric acid and phosphoric acid) and fatty acids (e.g., stearic acid, linoleic acid and octylic acid), and their metal salts. These catalyst compounds can be used either alone or as mixtures. Zinc salts of higher carboxylic acids can be used, such as zinc salts of aliphatic or alicyclic carboxylic acids containing 8 to 20 carbon atoms, preferably 8 to 17 carbon atoms. Examples of these zinc salts include zinc stearate, zinc octanoate, zinc laurate, and zinc naphthenate, with zinc stearate preferred. These higher carboxylic acid zinc salts may be mixed with a minor amount of another silanol condensation catalyst of the above-exemplified species, for example, organotin compounds such as dibutyltin dilaurate, dibutyltin maleate or dibutyltin diacetate. The amount of the other silanol catalyst in the mixture should be minimized, and preferably limited to not more than 5 percent based on the total weight of the mixed silanol catalyst.

The amount of the silanol condensation catalyst can be varied according to the type and amount of the silane compound bonded to the modified polyolefin resin. Generally, its amount is at least about 0.01 parts by weight, preferably 0.1 to 20 parts by weight, and most preferably 0.5 to 10 parts by weight, per 100 parts by weight of the silane-modified polyolefin resin.

The blowing agent used in the method of this invention is preferably a volatile organic blowing agent, preferably a hydrocarbon or halogenated hydrocarbon, or a compressed inert gas. Examples of the former include ethane, propane, n-butane, isobutane, pentane, neopentane, isopentane, n-hexane, isohexane and petroleum naphtha or "petroleum ether"; methyl chloride, methylene chloride, trichlorofluoromethane, chlorodifluoromethane, dichlorodifluoromethane, and 1,2-dichlorotetrafluoroethane; and examples of the latter include physical blowing agents such as carbon dioxide, nitrous oxide and nitrogen, which are suitable for accomplishing the extent of foaming greater than 10 times. Petroleum naphtha and petroleum ether are used synonymously and refer to a specific distillation range for petroleum products under ASTM D86 which produces a liquid containing primarily pentane and/or hexane. Provided that they are non-reactive with the thermoplastic polymer(s) employed, the volatile organic blowing agent can include various organic compounds such as alcohols, esters, aldehydes and ketones—for example, methanol, ethanol, methyl acetate, ethyl acetate, acetone, methyl formate, ethyl formate, propionaldehyde and diisopropyl ether can all be used.

In the present invention, the hydrocarbon blowing agents from ethane through isobutane generally produce shrunken foam beads primarily through their diffusion from the foam's cell structure, while those from pentane through petroleum naphtha generally tend to produce shrinkage mainly through condensation. The relative effects of diffusion and condensation of the blowing agent upon shrinkage will depend upon the permeability of the polymer cell walls to the blowing agent used. For example, with a pentane blowing agent both effects are important with most polymers, but with the copolyester-ether elastomers known as Hytrel ® which have relatively low permeability to pentane, the condensation effects would predominate. Suitable halogenated hydrocarbons can be obtained commercially from Du Pont of Wilmington, DE as FREON ® fluorocarbons, and from Allied Chemical of Morristown, NJ under the GENETRON ® Trademark. Preferred fluorocarbons for use in the present invention include FREON ® or GENETRON ® 12 and 22 due to their easy diffusion through polyolefins, and 11 and 113, due to their low vapor pressure and rapid diffusion properties. The numbers correspond to the chlorofluorocarbon (CFC) numbers known in the art. n-Butane, propane, pentane and mixtures therefor are presently the most preferred hydrocarbons, due to their vapor pressure and solubility in polyolefin resins. Volatile organic blowing agents which are substantially soluble in the polyolefin resin to be processed are particularly preferred, as they produce finer, better distributed bubbles. These preferences are based upon observations of the effects of various blowing agents in processing polyolefins; the same blowing agents may operate differently with other polymers.

Other blowing agents useful in the present invention and some of their physical properties are listed in Tables I and II, and in U.S. Pat. Nos. 3,843,757; 3,960,792; 3,657,165; 4,528,300; 4,368,276 and 4,214,054, all of which are incorporated herein by reference.

| BLOWING AGENT PHYSICAL PROPERTIES AT 25° C. | | | | | |
|---|---|---|---|---|---|
| Name | Formula | Mwt | Bpt | Pvap | Liquid Density |
| CFC-11 | $CFCl_3$ | 137.4 | 23.8 | 15.32 | 1.476 |
| CFC-12 | $CF_2Cl_2$ | 120.9 | −29.8 | 94.51 | 1.311 |
| CFC-22 | $CHF_2Cl$ | 86.5 | −40.8 | 151.40 | 1.194 |
| CFC-113 | $CFCl_2CF_2Cl$ | 187.4 | 47.6 | 6.46 | 1.565 |
| CFC-114 | $CF_2ClCF_2Cl$ | 170.9 | 3.6 | 30.96 | 1.456 |
| CFC-115 | $CF_2ClCF_3$ | 154.5 | −38.7 | 132.18 | 1.284 |
| CFC-142b | $CF_2ClCH_3$ | 100.5 | −9.2 | 49.16 | 1.110 |
| CFC-152a | $CHF_2CH_3$ | 66.0 | −24.7 | 86.81 | 0.899 |
| CFC-123 | $CHCl_2CF_3$ | 153.0 | 27.1 | 13.27 | 1.461 |
| CFC-123a | $CHFClCF_2Cl$ | 153.0 | 28.2 | 12.61 | 1.467 |
| CFC-124 | $CHFClCF_3$ | 136.5 | −12.0 | 55.85 | 1.356 |
| CFC-134a | $CH_2FCF_3$ | 102.0 | −26.5 | 96.52 | 1.207 |
| MeCl | $CH_3Cl$ | 50.5 | −24.2 | 82.16 | 1.098 |
| $MeCl_2$ | $CH_2Cl_2$ | 84.9 | 40.1 | 8.22 | 1.322 |
| Propane | $C_3H_8$ | 44.1 | −42.1 | 137.89 | 0.491 |
| n-Butane | $C_4H_{10}$ | 58.1 | −0.5 | 35.26 | 0.573 |
| i-Butane | $CH_3(CH_3)CHCH_3$ | 58.1 | −11.7 | 50.53 | 0.551 |
| n-Pentane | $C_5H_{12}$ | 72.2 | 36.1 | 9.90 | 0.621 |
| i-Pentane | $CH_3(CH_3)CHCH_2CH_3$ | 72.2 | 27.0 | 14.23 | 0.615 |
| Carbon dioxide | $CO_2$ | 44.0 | | | |
| Nitrogen | $N_2$ | 28.0 | | | |
| Oxygen | $O_2$ | 32.0 | | | |

Mwt: g/mol, Bpt: °C., Pvap: psia, Density: g/cm³

TABLE II

| PROPERTIES OF TYPICAL PHYSICAL BLOWING AGENTS | | | | |
|---|---|---|---|---|
| Physical Foaming Agent | Mol. wt. | Density g/cc at 25° C. | BP °C. | Heat of Vaporization Cal (15° C./g) |
| Neopentane | 72.15 | 0.613 | 9.5 | |
| 1-Pentene | 70.15 | 0.641 | 30.0 | |
| Cyclopentane | 70.15 | 0.740 | 49.2 | |
| n-Hexane | 86.17 | 0.655 | 68.7 | 80.4 |
| Isohexane | 86.17 | 0.653 | 58.0 | 75.0 |
| 1-Hexene | 84.17 | 0.669 | 63.5 | |
| Cyclohexane | 84.17 | 0.774 | 80.8 | 94.8 |
| n-Heptane | 100.20 | 0.679 | 98.4 | 77.0 |
| Isoheptane | 100.20 | 0.670 | 90 | 78.4 |
| 1-Heptene | 98.20 | 0.693 | 93.2 | |
| Benzene | 78.11 | 0.874 | 80.1 | 94.1 |
| Toluene | 92.13 | 0.862 | 110.6 | 98.6 |
| Trichloromethane | 119.39 | 1.489 | 61.2 | 66.7 |
| Trichloroethylene | 131.40 | 1.466 | 87.2 | |
| 1,2,Dichloroethane | 98.97 | 1.245 | 83.5 | 77.3 |
| Tetrachloromethane | 170.90 | 1.440 | 3.6 | |
| Perfluorocyclobutane | 153.84 | 1.584 | 76.7 | 46.6 |

The shrinkage of the beads can be at least partially controlled by balancing the type and level of blowing agents used. Blowing agents like HCFC-22, CFC-12, butane and propane tend to induce collapse of the beads because of their rapid diffusion from the foam. Agents such as CFC-11, pentane and petroleum naphtha will induce collapse through permeation, plus very low or no vapor pressure at room temperature. The second group of blowing agents will induce collapse much more than the first, so by balancing the levels and types used, the desired amount of expandability and final molding density can be produced. Cell size also plays an important role in the process as well as the surface appearance and void content of the final molded product, with larger cell size tending to induce faster and more complete bead collapse as well as rougher surface appearance in the beads, but smoother surfaces and lower void content in the final molded product.

Although the introduction of a volatile organic or gaseous blowing agent into the polymer melt is presently preferred, it is also possible to use solid chemical blowing agents by introducing them into the hopper of the mixture with the polymer particles and other materials. Suitable solid chemical blowing agents include azo compounds such as azodicarbonamide, mixtures of sodium bicarbonate and citric acid, gypsum, various hydrated aluminas such as aluminum trihydrate, sodium borohydrate and the like. To provide a contrast to the permeation of the nitrogen in air into the polymer foam cell structure, chemical blowing agents which produce gases such as carbon dioxide or water are preferred to those which produce nitrogen.

As mentioned above, the relative permeability of the polymer foam cell walls to the blowing agent as compared with air can be altered to produce suitable rates and degrees of shrinkage by the use of additives such as solvents for polymers and so-called anti-aging additives or stability control agents, referred to herein as "permeability adjustment additives." Exemplary of such additives are esters of long-chain fatty acids and polyhydric alcohols as described in U.S. Pat. No. 3,644,230; saturated higher fatty acid amides, saturated higher aliphatic amines and complete esters of saturated higher fatty acids disclosed in U.S. Pat. Nos. 4,217,319 and 4,214,054, respectively, and mixtures of glycerol mono- and diglycerides, available commercially as Pationic ™ products from the C. J. Patterson Co. of Kansas City, MO. A particular version of such additives is a mixture of a minor portion of glycerol mono- and a major portion of distearates, sold commercially as ATMOS 150. Polystyrene can be utilized as a permeability adjusting additive with certain polyolefins, as disclosed in U.S. Pat. No. 4,640,933. Also useful as permeability adjusting additives are copolymers of $\alpha$-olefins with various monoethylenically-unsaturated carboxylic acids, such as those described by Park in U.S. Pat. No. 4,347,329, and the copolymers of $\alpha$-olefins with neutralized carboxyl-group bearing moieties commonly referred to in the art as ionomers. The permeability-adjusting additives, when used, are present in amounts effective to adjust the permeability of the polymer foam cell walls to the blowing agent used, relative to air or other ambient atmosphere, so as to produce the desired rate and degree of shrinkage. The amount of such additives can range from about 0.1 to 10 weight percent of the polymer composition, preferably from about 0.3 to about 2 weight percent, for the esters, amines, amides and the like; from about 5 to about 95 weight percent, preferably from about 10 to about 50, for $\alpha$-olefin-carboxylic acid copolymers and ionomers and from about 5 to 50, prererably about 10 to 30, weight percent for the use of polystyrene in polyolefins.

The molding of the prior art foam beads which are not shrunk in accordance with the present invention can be performed in several ways. The beads can be fed to a mold with at least one movable side which can compress the beads where they are subjected to a heat source, such as pressurized steam. Once the polyolefin comprising the beads is softened enough that it will fuse with itself, the compressible wall (walls) of the mold moves to compress the beads together, causing the beads to fuse together and conform to the shape of the mold. Using a similar method, the beads are placed in a container adjacent to the mold and this container is pressurized with a compressed gas, such as air, causing the volume of the beads to decrease. The beads are then transferred in this compressed state to the mold, which is also pressurized to generally the same pressure. The mold containing these compressed crosslinked polyolefin beads is closed and injected with pressurized steam to heat the beads to the temperature where the polyolefin will fuse. The pressure is released from the mold and the beads re-expanded back to their equilibrium volume. As the fusible beads re-expand, they fuse into one part with very little void space within.

In another method, known as the "crush-fill" method, the foam beads are used to fill a mold, then compressed into the molding spaces as by movement of at least one wall of the mold, and steam is injected at a suitable pressure for a time sufficient to soften and fuse the beads. Steam pressures ranging from about 5 to 60 psig (0.35 to 4.2 kg/cm$^{-2}$)can be used and maintained for times ranging from about 1 to 15 seconds. Upon release of both physical and steam pressure, the beads are molded into a fused foam object in the desired shape. The use of steam in these molding methods may facilitate the initial crosslinking and fusing of the silane-crosslinked foam beads.

A notable advantage of the shrunken beads prepared in accordance with the present invention, whether crosslinked or not, is that they do not require crush filling or pressurized filling of the mold as described above; the mold can be filled at atmospheric pressure (or at a slight overpressure when blow filling is used), after which steam or other heated gas is introduced under the conditions set forth above to produce acceptable moldings. Although such beads can also be used in crush-fill or pressure-fill molding methods, if too large a quantity of the beads is forced into the mold, the resulting moldings may not display suitable physical integrity when removed from the mold. (See EXAMPLE 6.)

Once the molded objects are removed from the mold and cooled, their properties can optionally be improved by annealing, i.e. heating in an oven for an effective period of time at an effective temperature to stabilize the size and shape of the molded objects. Generally, if there has been shrinkage of the molded parts, the parts will expand slightly during annealing so as to restore the part's proper size and shape, at the same time reducing the density of the molded foam. Temperatures ranging from about 100° to about 200° F., (37.8° to 93.4° C.), preferably from about 140° to about 180° F. (60° to 82.2° C.), can be used. Depending upon the temperature used and the amount of annealing required, annealing times ranging from about 2 to about 48 hours, preferably from about 4 to about 24 hours, can be employed. Such annealing is most likely to be helpful with flexible polyolefins such as polyethylene, but less likely with "stiffer" polymers such as polystyrene.

A great advantage of this process for the manufacture of moldable foam beads is that commercially available raw materials and relatively simple and inexpensive equipment are utilized. In this respect, a small foam bead facility may be set up at the molding site, thereby eliminating the high cost of shipping the bulky foam beads. Another advantage is that the molder need manufacture only as much material for molding as presently required, eliminating the large storage areas typically required for the storage of large bulk shipments. The molder may manufacture the beads to the specifications required as needed, such as density, color, etc. This process does not require the use of an autoclave-type pressure reactor for the manufacture of moldable polymer beads, nor does it utilize a pre-molding pressurizing step to impart expandability to the beads. When silane-crosslinked polymers are employed, this process does not require the use of a high energy radiation source for crosslinking. The degree of crosslinking throughout the beads will be generally more consistent using silane crosslinkages rather than radiation crosslinking, as the crosslinking sites are well dispersed throughout the polyolefin in the extruder while, with the use of radiation crosslinking, the effect tends to penetrate just slightly below the surface and not throughout the whole foam particle. The use of high energy radiation, such as electron beams or X-rays, also requires certain safety precautions to be observed, which frequently makes this method of crosslinking disadvantageous.

If desired, the composition of this invention can contain various conventional additives such as coloring agents, nucleating agents, lubricants, fire retardants, fillers, foaming aids, anti-static agents and deterioration inhibitors of suitable types in the amounts usually employed in the art.

EXAMPLES

The following Examples serve to give specific illustrations of the practice of this invention but they are not intended in any way to act to limit the scope of this invention. The numbered examples represent the present invention. The lettered examples do not represent the present invention and are for comparison purposes.

The following designations used in the examples and elsewhere in the present application have the following meanings:

| ABBREVIATION | DEFINITION |
| --- | --- |
| ASTM | American Society for Testing Materials |
| CFC, HCFC | chlorofluorocarbon, any of the commercially available organic compounds containing at least one carbon atom, fluorine and chlorine |
| °C. | temperature, degrees Centigrade |
| °F. | temperature, degrees Farenheit |
| dg/min. | melt index, decigrams per minute |
| g/cc | density, grams per cubic centimeter |
| g, gm | grams |
| hrs. | hours |
| Hydrocerol CF$^R$ | a mixture of sodium bicarbonate, citric acid and citric acid salts, useful as a solid chemical blowing agent and/or for nucleation and cell size control. |
| " | inches |
| kg·cm$^{-2}$ | pressure, kilograms per square meter |
| kg/m$^3$, kg·m$^{-3}$ | density, kilograms per cubic meter |
| L/D | length to diameter ratio |
| min. | minutes |
| pcf | pounds per cubic foot |
| psig | pounds per square inch, gage |
| PV = nRT | P = pressure, psig or atm.; V = volume, cubic feet or liters; n = moles of gas (grams/mole wt.); T = temperature in degrees Kelvin; and R is the Ideal Gas Constant in consistent units |
| rpm | revolutions per minute |

EXAMPLE 1 AND COMPARATIVE EXAMPLE A

This example illustrates the production of unshrunken crosslinked polyethylene foam beads. The raw material resin, a silane-grafted polyethylene, was melted in an extruder having heating and cooling means into which a blowing agent (a refrigerant such as a halogenated hydrocarbon or hydrocarbon such as butane) was injected. These components were mixed and cooled to the proper foaming temperature (220° F. or 104.5° C.), as extruded from the die. Strands of foam were extruded from the extruder through a flat die with a row of round holes of the desired size and separation. These strands were cut immediately adjacent to the die by a rapidly rotating rotor with eight blades. The size of the cut beads depended upon the speed of the cutter and upon the speed with which the strands emerged from the die. By changing the speed of the cutter, the size of the beads could be regulated. Examples of such unshrunken beads are shown in FIG. 2.

It was found that the fully expanded beads extruded from polyethylene must generally be crosslinked in order to be moldable into an acceptable product. The method of crosslinking used was silane crosslinking, using commercially available silane-grafted polyethylenes and a silanol condensation catalyst. These materials were processed in the same manner as a normal polyethylene and the resulting products formed crosslink upon exposure to moisture. The foam must generally be crosslinked so that it does not collapse when exposed to pressurized steam during molding. Several suppliers of the moisture curable, silane-crosslinked polyethylene compounds have been found and these products are manufactured using the technology described in U.S. Pat. No. 3,646,166.

The crosslinked polyethylene beads produced had a diameter of approximately ⅜" (0.95 cm) and a density of approximately 2.2 pcf (35.2 kg.m$^{-3}$). Beads of smaller diameters could be produced through the use of smaller holes and faster cutter speed.

In Example 1, some of the crosslinked beads were molded using two methods. First a bowl was filled loosely with some one-week old crosslinked beads and put in an oven at 250° F. (121° C.). After 20 minutes, the beads were compressed by a tight-fitting top and held in the oven at 250° F. for an additional 20 minutes. After removal from the bowl and cooling, the product obtained had a final density of 4 pcf (64.1 kg.m$^{-3}$) and the beads were fused together throughout the part. Second, some of these same beads were fed to a steam-chest mold, such as used for expanded polystyrene bead molding. In the initial trials of steam-chest molding, the product was either collapsed or not totally fused, apparently due to poor mold filling.

In Comparative Example A, ⅜" (0.95 cm) diameter foam beads made from non-silane-grafted polyethylene (and thus uncrosslinked) were placed in the same bowl in a 250° F. (121° C.) oven for molding. After a short time, however, the beads collapsed by about 90 percent, indicating that when fully expanded, such uncrosslinked polyethylene foam is not thermally stable enough for molding.

EXAMPLE 2

This example illustrates the production of moldable unshrunk foam beads of a crosslinked polyethylene. A low density polyethylene resin grafted with silicon tetrahydride, having a melt index of 2.5 dg/min. and a density of 0.918 g/cc, was used as the base resin. Ninety-five (95) parts of this resin was tumble-mixed with 5 parts of a polyethylene concentrate containing the proper amount of a silanol condensation catalyst. Both of these products were obtained from BP Performance Polymers, Inc., and have the trade names Siocure® PE-1102 (base resin) and PE-1104 (proprietary catalyst-containing master batch). A very small amount (less than 0.1%) of talc was added to the resin mix at the hopper as a nucleating agent. A curing additive—a mixture of a minor portion of glycerol mono and a major portion of distearates sold commercially as ATMOS 150—was included as 0.7 weight percent of the mixture.

This mixture was fed into a 3" extruder having a 48:1 L/D ratio at a rate of 80 pounds per hour (36.3 kg./hr). An 80:20 (by weight) mixture of bis-dichlorotetrafluoroethane and dichlorodifluoromethane (available from DuPont as HC-114 and -12) was pumped into the extruder at an intermediate point at a rate of 20 percent by weight based on the weight of the resin. The molten mixture was blended until the blowing agent was fully dissolved in the resin. The temperature at this point was 350° F. (176.7° C.). This mixture was forwarded to the end of the extruder and cooled to approximately 220° F. (104.5° C.). The melt then passed through a static mixer having an inside diameter of $3\frac{1}{2}$" (8.9 cm) and a length of 20" (50.8 cm). The static mixer chamber was held at a temperature of 220° F. (104.5° C.). The melt was then extruded through a flat die plate containing 8 holes of 0.063" (1.6 mm) diameter arranged in a straight horizontal line.

A cutter consisting of a 4" diameter rotor with 8 horizontal blades rotating at approximately 650 rpm cut the extrudate into beads at the die. The cut beads fell into a collection bin and were drawn to a storage bag through a suction blower. The beads produced were oval in shape, measuring about $\frac{3}{8}$" by $\frac{1}{4}$" (0.95 by 0.66 cm) diameter and a skin was present on the entire surface of each bead. The beads had a density of 2.2 pcf (35.2 kg.m$^{-3}$). The beads were stored at ambient conditions for three days, after which crosslinking had proceeded to a great enough extent to impart the needed heat resistance for molding. Some of the beads were molded into a foam product by heating and compression.

HYPOTHETICAL EXAMPLE 3

Moldable unshrunk or shrunken polyethylene foam beads are prepared from the base materials of EXAMPLE 2, using a solid blowing agent rather than the volatile organic blowing agent of EXAMPLE 2. Using a similar extruder, the same silicon-grafted polyethylene resin and catalyst master batch as employed in EXAMPLE 2 are tumble-mixed with a quantity of a solid chemical blowing agent such as a bicarbonate or hydrated alumina sufficient to generate gases (in such cases, $CO_2$ or $H_2O$) sufficient to provide the desired degree of expansion. Due to the presence of the solid particles of blowing agent, additional nucleating agents need not be used. The mixture is heated and fed through the extruder as in EXAMPLE 2, with the molten mixture reaching equivalent temperatures. No additional blowing agent is introduced during the mixing, but the elevated temperatures cause the solid chemical blowing agent to release a gas, which causes the molten polymer mixture to foam upon emerging from the extruder die plate. Provided the initial tumble-mixing and the mixing in the extruder itself are sufficiently thorough, a more homogeneous distribution of the gas bubbles which cause foaming can be obtained than if nitrogen or another inert gas were injected directly into the extruder barrel to be mixed with the molten polymer.

The extruded foam product is cut and processed as in EXAMPLE 2, producing crosslinked foam beads with molding properties equivalent to those produced by injection of gaseous or volatile organic blowing agents into the extruder barrel. By selecting the polymer blend and the solid chemical blowing agent so that the permeability of the cell walls is greater for the gases generated by the blowing agent than for air, the expanded foam beads are caused to shrink substantially in less than about one hour.

EXAMPLE 4 AND COMPARATIVE EXAMPLE B

These examples illustrate the molding of objects from moldable unshrunk foam beads of a silane-crosslinked polyethylene in a mold whose volume can be altered during molding (a "crush-fill mold"), and to compare the performance of crosslinked unshrunk polyethylene foam beads with similar expanded foam beads which are not crosslinked in steam chest molding.

Silane-crosslinked beads were produced by a procedure similar to that of EXAMPLE 2, using the same base resin (a low density polyethylene resin grafted with silicon tetrahydride) and master batch containing the silanol condensation catalyst. Foam beads were also produced from an uncrosslinked resin using a low density polyethylene having a melt index of 2.6 and a density of 0.918 g/cc obtained under the trade name Norchem® 957 from Enron Chemical Co., recently acquired by U.S. Industrial Chemicals. The blowing agent in each case was a 20:80 blend (by weight) of commercial chlorofluorocarbons (CFC) 12 and 114. CFC 12 is essentially dichlorodifluoromethane and CFC 114 is essentially bis-dichlorotetrafluoroethane. The gel content of the crosslinked polyethylene was 81.8 percent, as tested by ASTM D-2765.

The mold employed in the trials contained a volume of approximately 25 cubic inches (410 cc), and could be opened or closed during molding to alter the volume. If the mold was opened to the extent that the opening at the seam exceeded about $\frac{3}{8}$" (0.95 cm) (i.e., about the diameter of the foam beads), beads would escape from the mold through the seam opening and the mold could not be filled properly. Thus, the volume decrease during molding was limited to about 10 percent.

Molding was carried out by charging beads to the mold and applying steam pressure. Steam pressures ranging from about 30 to about 65 psig (2.1 to 4.6 kg.cm$^{-2}$) were used, with molding times ranging from about 1 to 12 seconds. If a high enough steam pressure was used for sufficient time (generally at least 30 psig for 12 seconds), the beads were forced together and fused to conform to the shape of the mold. If lower steam pressures than 30 psig were used, the beads did not totally fuse together. One portion of the mold was found to be too narrow in that the beads did not easily fill the area, but this condition could be remedied by using smaller (i.e., shrunken) beads or a less constricted mold.

Several molded objects were produced using this mold and the crosslinked foam beads, with the densities of the molded objects ranging from 2.6 to 2.7 pcf (41.7 to 43.2 kg.m$^{-3}$). The foam beads in the molded objects were fused together very well, as indicated by the fact that when the parts were ripped, beads fractured along about 75 percent of the fracture line, while intact beads separated along only about 25 percent of the fracture line.

The molded objects were found to shrink slightly when removed from the mold and cooled. After such cooling, one part (original density 2.67 pcf/42.8 kg.m$^{-3}$) was placed in an oven at 140° F. for 24 hours. When removed from the oven, its mass had decreased by 6.4 percent, its volume had increased by 29.2 percent, and the new density was 1.90 pcf (30.4 kg.m$^{-3}$). After another 24 hours in the oven at the same temperature, the part's mass was unchanged, but the volume increased by another 4.3 percent, giving a new density of 1.83 pcf (29.3 kg.m$^{-3}$). The densities of the parts oven-heated after molding were all less than the density of the unmolded beads (2.3 pcf/36.8 kg.m$^{-3}$) and the density of the molded, cooled part.

For Comparative Example B, the uncrosslinked polyethylene beads as described above were molded in the same manner as the crosslinked beads. When the mold was opened, the foam beads were shrunken and collapsed, and hardly fused, indicating that some crosslinking is generally needed for successful molding of unshrunken beads of such foams. The degree of crosslinking can be controlled by the amount of the silane crosslinking agent and catalyst used to produce the crosslinked resin, but if desired non-crosslinked resins can also be blended with the crosslinked material prior to extrusion and foaming.

EXAMPLE 5

This example illustrates the molding of objects from crosslinked unshrunk polyolefin foam beads in a "crush-fill" mold and the effects of annealing upon the molded parts.

Foam beads prepared as in EXAMPLE 2 were used in a mold in which the volume could be reduced as much as approximately one third by moving one mold wall inward. The beads were fed to the mold and then subjected to steam under pressure for a time effective to soften and fuse the beads (e.g., about 45 psig or 3.2 kg.cm$^{-2}$ for 8 seconds). The mold wall was then moved inward to reduce the volume to about two thirds the original volume, and water was passed through the mold cooling jacket for cooling. The mold was then opened completely and the molded parts removed. The parts collapsed or shrank somewhat as they cooled. The cooled molded parts were then placed in an air circulating oven at 165° F. (73.9° C.) for varying periods of time for annealing. During this heating process, the parts expanded back to the original shape and size of the mold. In addition to increasing the volume of the molded part, this "annealing" also seemed to drive off moisture left in the part from the molding step. All the parts molded and annealed retained the shape of the mold, and the foam beads were fused together well. Table 1 below summarizes the processing and properties of the molded foam parts made.

TABLE 1

| Trial | Orig. Vol. (cu.ft.)/cc | Orig. Wt. gm | Time Final Vol. (cu. ft.)/cc | Final Wt. (gm) | Time in Oven (hrs.) | Final Density (pcf)/ kg · m$^{-3}$ |
|---|---|---|---|---|---|---|
| 1 | .032/906 | 42.00 | .037/1048.7 | 34.48 | 5 | 2.06/33.0 |
| 2 | * | * | .040/1132.8 | 36.40 | 5 | 2.00/32.0 |
| 3 | * | * | .037/1047.7 | 33.55 | 5 | 2.00/32.0 |
| 4 | * | * | .035/991 | 28.71 | 16 | 1.80/28.8 |
| 5 | * | * | .038/1076 | 32.84 | 16 | 1.89/30.3 |

* Not measured

The following examples illustrate various embodiments of the present invention, which is directed to moldable shrunken foam beads of thermoplastic polymers. As with the previous examples relating to moldable unshrunk silane-crosslinked polyolefin foam beads, the numbered examples represent the present invention, while the lettered examples are for comparison purposes.

EXAMPLE 6

Moldable shrunken crosslinked polyethylene beads were produced using 50 percent crosslinkable silane-polyethylene copolymer (10 percent of which was a catalyst). The beads were prepared following the procedures of U.S. Pat. No. 4,702,868 (Pontiff and Collins) except for the addition of 0.5 weight percent zinc stearate, which acts as an additional catalyst and processing aid with this resin. Also in the mixture was 14 percent of a masterbatch containing 10 percent of a glycerol mono- and di-glyceride mixture (Pationic ® 1052) as the permeability adjustment additive.

Before cutting the beads it was noted that the extruding foam strands looked good—like 2 pcf foam. The resin and blowing agent through-put levels were consistent with previous 2 pcf runs. The cutter was started and the beads were collected, as usual, in a box. It was noted that the foam was collapsing during the first 15 minutes after extrusion. The beads were allowed to crosslink at ambient conditions.

Eleven days later these beads were evaluated in the steam molder. These beads were then quite collapsed, about one-half their original volume after extrusion. First, the mold was set so as to reduce the volume of the mold by half after filling with beads, consistent with previous practice. When the mold was opened, the fused part blew apart, showing that the beads were crushed too much. The crush percentage was reduced several times in subsequent trials, but the molded parts still exploded. The beads were then molded without crushing and the foam molding looked surprisingly good; it was well fused and looked about the same as parts molded from uncollapsed beads molded after crushing (or pressure filling).

Processes based upon Example 6 are novel because the shrinkage of the beads is part of the extrusion process of bead manufacture and is apparently controlled by a balance of the amount and type of blowing agent (permeability), permeability adjustment additive and amount (alters the blowing agent permeability), and extrusion temperature (higher temperatures cause more collapse). The shrinkage or "treatment" is thus affected by the raw materials chosen and how they are processed, and foam beads which are directly moldable are produced without an additional step being required.

The density of the moldings produced from the beads (without crush) was approximately equivalent to that of the bulk density of the beads prior to molding. After molding, the parts shrank slightly (as do all polyolefin foam moldings) but recovered to substantially the original molded dimensions when stored for approximately 24 hours at 170° F. (86° C.). During this storage, the shrunken molding surprisingly recovered substantially completely to yield a void-free molded part.

Processes of producing and using such shrunken moldable beads differ from the disclosure of U.S. Pat. No. 4,483,809 (assigned to Kanegafuchi) in that the beads are extruded and shrunk by an extrusion-controlled process and are shrunk before substantial crosslinking occurs. Additionally the Kanegefuchi patent states that moldings produced by its process have about the same density as the pre-expanded beads before treatment.

EXAMPLE 7

Four similar runs were performed making shrunken crosslinked polyethylene beads using various levels of a permeability adjustment additive (Pationic 1052, a mono- and di-glyceride mixture) and various blowing agents and mixtures thereof. The purpose was to study the shrinkage after extrusion for the purpose of molding the beads without any premolding treatment.

A 3-inch (7.62 cm) foam extruder with a die face cutter was used. The resin mixture was melted and mixed in the extruder. The blowing agent was injected under pressure into the barrel and mixed with the resin mixture. The blowing agent and resin solution was then cooled to the proper temperature for foaming and extruded through 15 holes, each with a diameter of 1/16" (1.6 mm). The extrudate was then cut by a propeller-like rotating apparatus holding two blades, rotating at about 2000 RPM. The extrudate was cut into foam beads and collected.

The resin mixture was: 67.5 pounds DFDA 1594 (UNION CARBIDE moisture crosslinkable polyethylene-silane copolymer), 7.5 pounds DEFD 1702 (catalyst masterbatch), 0.75 pounds zinc stearate additional (catalyst and processing aid), 74.25 pounds Norchem 957 ® (LDPE resin). All samples were made with small amounts of talc for cell size control except the following: Trials 9–12, 15 and 16. Hydrocerol CF ® used for these exceptions, as more efficient nucleation was required for these blowing agent blends. (Hydrocerol nucleates more efficiently than talc).

The beads produced in the above trials shrank significantly within about 25 minutes of cutting, thereafter remaining substantially stable in size. The beads were exposed to ambient conditions for varying periods to effect the silane crosslinking before molding. The beads of Trials 1 to 4 were thus aged for 7 days before molding, those of Trials 5 to 8 were aged for 6 days, and those of Trials 9 to 12 were aged for 5 days. Thus, the beads of the later trials may not have attained the same degree of crosslinking as those of the earlier trials. All beads as extruded and cut before shrinkage appeared to have a density of approximately 2 pcf, but it was, of course, impossible to measure their densities exactly due to the rapid rate of shrinkage. It can be seen that the more collapsed beads (i.e., the denser beads) produced moldings of much lower densities than the beads themselves. It has been found that uncollapsed beads require much more crush to mold properly into moldings which are free of voids.

While a comprehensive theory explaining the observed phenomena has not been developed, a partial explanation may be as follows. The blowing agents HCFC-22 and CFC-12 have relatively high vapor pressures. The beads extruded using these blowing agents shrink because the blowing agent escapes from the foam faster than air can replace it. The diffusion rate of the blowing agent out of the foam is somewhat controllable by adding a permeability adjustment agent such as a mixture of glycerol mono- and diglycerides; this slows the diffusion or escape of the blowing agent, making it more equal to that of air, thereby reducing shrinkage. On the other hand, CFC-11 and pentane have low vapor pressures and, therefore, condense to liquid phase near room temperature. This causes the beads to shrink more rapidly because the pressure inside the foam is quickly reduced greatly relative to that outside the foam. Beads made with low vapor pressure blowing agents are observed to shrink much faster than those made with high vapor pressure blowing agents, probably because this is a diffusion controlled process. The addition of a mixture of glycerol mono- and diglycerides to foams using low vapor pressure blowing agents helps to slow shrinkage and reduce the amount of shrinkage, apparently by decreasing the permeability of

TABLE 2

| Trial | Blowing[1] Agent/% by wt. | | PAA[2] % by wt. | Density (pcf) after shrinkage | Crush[3] Needed | Molding Density (pcf) | Quality[4] |
|---|---|---|---|---|---|---|---|
| 1 | HCFC-22 | 17.1 | 1.4 | 2.98 | 22.6 | 2.00 | 3 |
| 2 | 22 | 17.1 | 0.7 | 3.19 | 22.6 | 2.04 | 3 |
| 3 | 22 | 17.1 | 0.35 | 3.59 | 17.2 | 1.92 | 2 |
| 4 | 22 | 20.0 | 0 | 3.53 | 14.3 | 2.09 | 2 |
| 5 | CFC-12 | 20.0 | 1.4 | 2.08 | not molded | | |
| 6 | 12 | 20.0 | 0.7 | 3.32 | 21.3 | 1.99 | 2 |
| 7 | 12 | 20.0 | 0.35 | 3.30 | 17.3 | 2.00 | 2 |
| 8 | 12 | 20.0 | 0 | 4.04 | not molded | | |
| 9 | CFC-11 | 28.0 | 1.4 | 3.71 | 20.0 | 2.95 | 3 |
| 10 | 11 | 28.0 | 0.7 | 4.46 | 20.0 | 3.29 | 3 |
| 11 | 11 | 28.0 | 0.35 | 4.51 | 20.0 | 3.22 | 3 |
| 12 | 11 | 28.0 | 0 | 6.69 | 14.3 | 3.61 | 2 |
| 13 | HCFC-22 | 17.1 | 0 | 2.58 | 0 | 1.52 | 1–2 |
| 14 | HCFC-22+ n-Pentane | 11.3 5.6 | 0 | 3.36 | 0 | 1.46 | 1–2 |
| 15 | HCFC-22+ n-Pentane | 6.1 12.7 | 0 | 4.41 | 7.7 | 2.69 | 3 |
| 16 | n-Pentane | 18.4 | 0 | 6.92 | 0 | 3.71 | 4 |

[1]See Table I
[2]Permeability Adjustment Additive, Pationic 1052
[3]Crushed to produce proportional reduction of original volume, %
[4]Quality: 0) very poor 1) poor 2) satisfactory 3) good 4) excellent 3 & 4 are "salable" moldings the foam to the blowing agent. Thus, various combinations of blowing agents and the level and type of permeation adjustment agent will yield different shrinkage rates, amounts of shrinkage and densities of beads and moldings produced therefrom.

The above trials of EXAMPLES 6 and 7 illustrate that improved moldable beads can be produced by allowing the extruded beads to shrink before they become substantially crosslinked. If the shrinkage is sufficient to correspond to the appropriate expansion ratio, such beads can be used directly in molding under heat and pressure, without the normally required pretreatments such as crushing. It can be seen that allowing the polyethylene beads to shrink after extrusion, then crosslinking, allows them to be easily molded without crushing or pressurization. Several variables affect the amount of shrinkage—blowing agent type and amount, cell size, aging additive type and amount used. The following features tend to cause relatively greater shrinkage: blowing agents with higher boiling points (lower room temperature vapor pressure), blowing agents which more readily diffuse through cell walls of the polymer used, larger cell size (mainly with "high-boiler" blowing agents), and less permeability adjustment additive (mainly with polymers which are highly permeable to the blowing agents). The proper balance of these factors must be reached to obtain the desired result (moldability and final density). The further examples which follow illustrate these effects.

EXAMPLES 8-11 AND COMPARATIVE EXAMPLE C

For Example 8, into a 3-inch extruder, L/D 48:1, was fed a low density polyethylene resin with an MFI of 2.7 dg/min. Hydrocerol CF ®, a mixture of sodium bicarbonate and citric acid and citric acid salts, was added at a rate of 1.5 pph for nucleation and cell size control. CFC-11 was injected into the barrel at a rate of 32.5 pph and mixed into the resin mixture. The resulting melt was cooled to the proper foaming temperature, approximately 225° F. (108° C.), and extruded through a plurality of small holes approximately 1/16" in diameter. The foamed extrudate was cut into beads by a rapidly rotating knife. The beads were collected and stored. Before shrinkage (just after being cut), the density of the beads was approximately 2.5 pcf (40 kg/m³). After shrinkage, the density of the beads was 5.2 pcf (83.2 kg/m³). Eleven days later, the beads were molded and the results are listed in the TABLE 3 below.

TABLE 3

| | (EXAMPLE 8) | | | | |
|---|---|---|---|---|---|
| Trial | Molding Density pcf | Percent Crush | Expansion Ratio | Quality[1] | Steam Pressure psi |
| 1 | 3.64 | 0 | 1.43 | 3 | 9 |

TABLE 3-continued

| | (EXAMPLE 8) | | | | |
|---|---|---|---|---|---|
| Trial | Molding Density pcf | Percent Crush | Expansion Ratio | Quality[1] | Steam Pressure psi |
| 2 | 3.64 | 0 | 1.43 | 3 | 10 |
| 3 | 3.73 | 0 | 1.39 | 2 | 12 |
| 4 | 3.86 | 0 | 1.35 | 2 | 14 |

[1]As in TABLE 2.

This example illustrates that uncrosslinked polyethylene foam beads can be molded into acceptable products with no crush or pre-pressurizing treatment or pressure-filling devices. It also illustrates that, when utilizing "shrunken" beads, there is a relatively wide temperature window for molding, based upon the range of steam pressures used.

For comparative EXAMPLE C, the same resin was used to make polyethylene foam beads, except that CFC 12/114, in a 20:80 weight ratio, was used at a rate of 18 pph and talc was used for nucleation at about 0.1 pph. Additionally, the resin contained 0.7 percent of glycerol mono- and di-stearates as a permeability adjustment agent, which inhibits bead collapse by slowing the diffusion of the blowing agent from the foam. These beads had a density of approximately 2.0 pcf (32 kg/m³) and did not shrink appreciably after extrusion. In molding without crushing, the beads would either not fuse (in the case of too little steam), or collapse in the case of too much steam. If a 33 percent crush was applied, the beads behaved the same way, except that slightly more steam was required. Basically, if enough steam to fuse the beads was used, the beads would collapse too much. If low enough steam pressure so as to not collapse the beads was used, the beads would not fuse. It was found impossible to mold unshrunk, uncrosslinked polyethylene foam beads.

EXAMPLE 9

Using the same equipment as used in EXAMPLE 8, the following resin mixture (silane crosslinkable) was used:

| | |
|---|---|
| 90 lbs | Silane - Low density polyethylene copolymer, MFI 3.0 |
| 10 lbs | Condensation Catalyst Masterbatch, MFI 2.0 |
| 46 lbs | Low density polyethylene MFI 2.7, density .917 g/cc |
| 1 lb | Zinc Stearate processing aid |

This mixture was fed to the extruder at 80 pounds per hour (kg/hr). TABLE 4 below shows the resulting bead and molding properties. No crush was used during molding.

TABLE 4

| | (EXAMPLE 9) | | | | | | |
|---|---|---|---|---|---|---|---|
| Trial | CFC-11 Rate pph | CSC[2] pph | Bead Density pcf | Molding Density pcf | Expansion Ratio | Molding Cell Size Cells/in. | Quality[1] |
| 1 | 32.5 | 1.25 | 4.54 | 2.69 | 1.69 | 60 | 4 |
| 2 | 32.5 | 1.66 | 3.96 | 2.79 | 1.42 | 64 | 4 |
| 3 | 32.5 | 1.89 | 3.00 | unsuccessful | | | 0 |
| 4 | 40 | 1.66 | 4.79 | 2.62 | 1.83 | 58 | 4 |
| 5 | 40 | 1.89 | 5.17 | 3.05 | 1.70 | 68 | 4 |

[1]As in TABLE 2.
[2]Cell size control agent, Hydrocerol CF ®

Trials 1, 2 and 3 illustrate the effect of cell size on moldability and shrinkage. If the cell size is too small, the beads generally will not mold well or at all. Trials 4 and 5 show the effects of increasing blowing agent level—the beads shrink more but the moldings can have lower density if the cell size is larger.

EXAMPLE 10

Using the same machinery and resin mixture as in EXAMPLE 9, crosslinked shrunken polyethylene foam beads were made and the properties are listed in TABLE 5 below:

TABLE 5
(EXAMPLE 10)

| | CFC-11 Rate pph | HCFC-22 Rate pph | CSC$^2$ pph | Bead Density pcf | Molding Density | Expansion Ratio | Quality$^1$ |
|---|---|---|---|---|---|---|---|
| 1 | 22 | 6 | 0.53 | 5.01 | 2.34 | 2.14 | 4 |
| 2 | 33 | 0 | 1.25 | 5.38 | 3.45 | 1.56 | 3 |

$^1$As in TABLE 2.
$^2$As in TABLE 4.

Using the same machinery as in EXAMPLE 10, crosslinked polyethylene beads were made using the following resin mixture:

| |
|---|
| 67.5 lbs silane-ethylene copolymer |
| 7.5 lbs catalyst masterbatch |
| .75 lbs zinc stearate |
| 74.25 lbs low density polyethylene |

This mixture as fed to the extruder at 80 pph with talc powder at about 0.5 pounds per hour. A CFC 12/114 (20:80 weight ratio) blend blowing agent was injected at about 8 pph. The resulting beads had densities of about 2.0 pcf (32 kg/m$^3$) and did not shrink appreciably after extrusion. Molding results were as follows:

TABLE 6
(EXAMPLE 11)

| | Mold Density | Crush % | Quality$^1$ | |
|---|---|---|---|---|
| 1 | — | 0 | 0 | poor fusion, collapsed molding |
| 2 | 1.92 | 43 | 2 | |

$^1$As in TABLE 2.

Using crush-fill molding (or pressure filling), it is more difficult to get the steam to penetrate through the beads to get good fusion throughout the part. If no crush is used, a poor molding results as the beads do not expand to fill the mold.

EXAMPLES 12–13 AND COMPARATIVE EXAMPLE D

The following examples illustrate the utilization of silane-crosslinked polyethylene beads made according to U.S. Pat. No. 4,702,868 (Pontiff and Collins) for treatment similar to that employed in U.S. Pat. No. 4,483,809 (to Kanegafuchi) so as to "adjust the pre-expansion rate" to make the beads moldable without crush- or pressure-filling. Column 4, para. 1 of U.S. Pat. No. 4,483,809 indicates that foam beads for molding can be heated to pre-expand the beads to a peak expansion rate at pre-expansion of 1.3 to 3 times the expansion rate of beads to be packed into the mold.

Using the same equipment as in Examples 8–11, crosslinked polyethylene beads were made using the following resin formula:

45% Syncure S1019 (Silane grated polyethylene—Carlew Chemicals)
5% Syncure S1000b (condensation catalyst masterbatch—Carlew Chemicals)
48.67% USI 957 low density polyethylene
1.33% aging additive (Pationic 1052)

This mixture was fed to the extruder at about 80 pph (36.3 kg/h) with talc powder introduced at about 0.5 pph (0.23 kg/h). The blowing agent, a CFC 12/114 blend (20:80), was injected at about 18 pph (8.2 kg/h). The resulting beads had a density of 1.83 pcf (29.3 kg/m$^3$) and were not shrunken or collapsed appreciably after cooling.

Some of these beads (after at least one week aging for crosslinking and gas exchange) were treated in an oven for 1.25 hours at approximately 200° F. (92.5° C.). After this treatment, the density of the beads was found to be 2.50 pcf (40 g/cc). The beads had a relatively smooth surface with fine, uniform dimples and did not appear shrunken except that they were smaller than those not treated. FIG. 3 is a photomicrograph of commercially available "Eperan" polyethylene foam beads (density 1.9 pcf) believed to be produced by Kanegafuchi, probably under the above patent. The beads are substantially spherical, vary somewhat in size and are relatively smooth and glossy. The results of molding are listed below:

TABLE 7
(EXAMPLES 12, 13, D)

| EXAMPLE | CRUSH % | MOLD DENSITY (pcf) | EXPANSION RATIO | QUALITY$^1$ |
|---|---|---|---|---|
| D Untreated | 31.4 | 1.55 | 1.6 | 3 |
| 2 Treated | 0 | 1.78 | 1.4 | 2 |
| 3 Treated | 7.7 | 1.89 | 1.3 | 2 |

$^1$As in TABLE 2.

The "Expansion rate" of the untreated beads (equal to the "peak expansion rate") was 32.8 and the "adjusted expansion rate" was 24. Therefore, the ratio of these values was 1.37, just within the range disclosed and claimed in U.S. Pat. No. 4,483,809. The moldability of the beads was greatly improved by the heat treatment (expansion rate adjustment) in that little or no crush was required, even though the moldings from the beads adjusted in this example were not quite as good as those produced from the untreated beads. If the ratio of the expansion rates had been greater (i.e., more shrinkage from the treatment), the moldability would have probably been further improved (molding without crush).

EXAMPLE 14 AND COMPARATIVE EXAMPLES E AND F

Silane crosslinked polyethylene foam beads were prepared using the same resin formulation and equipment as in EXAMPLE 12 above, except that the permeability adjustment additive was used in the amount of 0.7 weight percent of the composition and an 80:20 weight ratio mixture of CFC 114 and 12 was used as the flowing agent, injected at a rate of about 19 pph (8.6 kg/hr). The beads produced did not shrink appreciably after formation. Some of these beads were molded, substantially as formed, and others were shrunk by exposure to a vacuum (20 inches Hg at room temperature for 24 hours), then exposure to atmospheric pressure, before being molded. The molding results below compare the density and quality of moldings obtained with the vacuum-shrunk beads (EXAMPLE 14) and the unshrunk beads at two levels of crush (COMPARATIVE EXAMPLES E and F).

TABLE 8

(EXAMPLES 14 E, F)

| EXAMPLE | Actual Bead Density (pcf) | Bulk Bead Density (pcf) | Crush (percent) | Molding Density (pcf) | Expansion Ratio | Quality |
| --- | --- | --- | --- | --- | --- | --- |
| E | 1.79 | 1.02 | 14.3 | 1.47 | 1.22 | 2-3 |
| F | 1.79 | 1.02 | 0 | 1.65 | 1.08 | 0-1 |
| 14 | 3.22 | 1.73 | 7.7 | 2.05 | 1.57 | 2-3 |

This example illustrates that vacuum treatment can be used as an alternative to adjusting the permeability of the polymer composition to the blowing agent so as to produce relatively rapid shrinkage of the beads after extrusion and cutting. By subjecting the beads to a vacuum for a period of time and strength effective to remove a significant portion of the blowing agent from the cells of the foam and permit some expansion of the beads, then subjecting them to atmospheric pressure, the beads can be shrunk sufficiently to permit molding with a reduced amount of crush required, down to as little as zero crush.

All moldings in the above Examples 6 through 14 were molded using a 12" by 12" (30.5 cm) mold which was 6" (15.25 cm) deep. The male side had a 3" (7.62 cm) telescoping protrusion so beads could be crushed up to 50 percent during molding. When the mold was closed, the thickness was 3". Therefore, for uncrushed moldings, the mold dimensions were 12"×12"×3". All moldings were cured in an oven at 180° F. (80° C.) for 24 hours after molding.

The above examples illustrate that crosslinked thermoplastic polymer foam beads suitable for molding, both shrunken and unshrunken, can be produced by the extrusion of polyolefin-type resins such as polyethylene containing blowing agents, each as described above in the specification. However, these examples should not be considered as limiting the scope of the present invention, which is limited only by the appended claims.

I claim:

1. A thermoplastic polymer foam bead, comprising: a moldable and shrunken thermoplastic polymer foam bead having a density, cell size and degree of shrinkage effective to provide a predetermined molding expansion ratio, wherein the density is in the range of from about 0.8 to about 20 pcf (12.8 to 320 Kg.m$^{-3}$), and wherein the molding expansion ratio is in the range of from about 1.1 to about 4.

2. Moldable shrunken foam beads in accordance with claim 1, wherein said thermoplastic polymer is selected from the group consisting of homopolymers and copolymers comprising olefin monomers having from 2 to about 8 carbon atoms, alkenyl aromatic polymers, polyvinyl polymers, polycarbonates, polyamides, polyesters, polyphenylene ethers, polyetherimides, fluorocarbon polymers and mixtures thereof.

3. Moldable shrunken foam beads in accordance with claim 2, wherein said polymer is a polyolefin selected from the group consisting of homopolymers and copolymers comprising olefin monomers having from 2 to about 8 carbon atoms.

4. Moldable shrunken foam beads in accordance with claim 3, wherein said polyolefin is selected from the group consisting of polypropylene, medium density polyethylene, low density polyethylene, low density polyethylene, linear low density polyethylene, polybutylene and mixtures thereof.

5. Moldable shrunking foam beads in accordance with claim 2, wherein said alkenyl aromatic polymer is a polystyrene, said polyamide is a nylon, said polyester is a polyethylene terephthalate and said polyvinyl polymer is a polyvinyl halide.

6. Moldable shrunken foam beads in accordance with claim 1, wherein said polymer is a thermoplastic elastomer.

7. Moldable shrunken foam beads in accordance with claim 1, produced by extrusion foaming with a blowing agent.

8. Moldable shrunken foam beads in accordance with claim 7, wherein said blowing agent is a volatile organic agent selected from the group consisting of hydrocarbons and halogenated hydrocarbons.

9. Moldable shrunken foam beads in accordance with claim 7, wherein said blowing agent is an inert gas.

10. Moldable shrunken foam beads in accordance with claim 7, wherein said blowing agent is a solid material which decomposes to form a gas.

11. Moldable shrunken foam beads in accordance with claim 1, wherein said thermoplastic polymer is crosslinked after the bead has shrunk.

12. Moldable shrunken foam beads in accordance with claim 11, wherein said crosslinking is accomplished by electromagnetic radiation or chemical means.

13. Moldable shrunken foam beads in accordance with claim 11, wherein said thermoplastic polymer is selected from homopolymers and copolymers comprising olefin monomers having from 2 to about 8 carbon atoms, and mixtures thereof, said foam contains a silane crosslinking agent and a silanol condensation catalyst, and crosslinking is accomplished by exposure of the shrunken foam beads to moisture.

14. Moldable shrunken foam beads in accordance with claim 7, wherein said beads shrink promptly following foaming due to at least one of the relatively high permeability of the foam cell wall to said blowing agent compared with the ambient atmosphere and the relatively low vapor pressure of said blowing agent at ambient temperature.

15. Moldable foam beads in accordance with claim 7, having a wrinkled surface layer or skin.

16. Moldable shrunken foam beads in accordance with claim 7, wherein the shrinkage is substantially complete within less than about one hour following foaming.

17. Moldable foam beads in accordance with claim 7, wherein the shrinkage is substantially complete within less than about 15 minutes following foaming.

18. Moldable foam beads in accordance with claim 7, wherein said polymer foam contains at least one permeability adjustment additive to adjust the permeability of said cell walls.

19. Moldable foam beads in accordance with claim 18, wherein said permeability adjustment additive is selected from the group consisting of esters of long-chain fatty acids and polyhydric alcohols, saturated higher fatty acid amides, saturated higher aliphatic amines and complete esters of saturated higher fatty acids.

20. Moldable foam beads in accordance with claim 18 wherein said permeability adjustment additive comprises a mixture of glycerol mono- and diglycerides.

21. Moldable foam beads in accordance with claim 18 wherein said permeability adjustment additive comprises a polystyrene.

22. Molded articles produced by thermal molding of the moldable shrunken foam beads of claim 1.

* * * * *